United States Patent
Suzuki et al.

(10) Patent No.: US 7,009,014 B2
(45) Date of Patent: Mar. 7, 2006

(54) PROCESS FOR THE POLYMERIZATION OLEFINS

(75) Inventors: Yasuhiko Suzuki, Sodegaura (JP); Tomoaki Matsugi, Sodegaura (JP); Yukihiro Takagi, Sodegaura (JP); Yasunori Yoshida, Sodegaura (JP); Junji Saito, Sodegaura (JP); Shigekazu Matsui, Sodegaura (JP); Yoshihisa Inoue, Sodegaura (JP); Terunori Fujita, Sodegaura (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 10/009,738

(22) PCT Filed: Jun. 29, 2001

(86) PCT No.: PCT/JP01/05651

§ 371 (c)(1), (2), (4) Date: Dec. 17, 2001

(87) PCT Pub. No.: WO02/02649

PCT Pub. Date: Jan. 10, 2002

(65) Prior Publication Data

US 2002/0151661 A1 Oct. 17, 2002

(30) Foreign Application Priority Data

Jul. 4, 2000 (JP) .................................. 2000-202581

(51) Int. Cl.
*C08F 4/44* (2006.01)

(52) U.S. Cl. .............. 526/161; 526/160; 526/172; 526/170; 526/151; 526/153

(58) Field of Classification Search ............... 526/161, 526/172, 126, 134
See application file for complete search history.

(56) References Cited

U.S. PATENT DOCUMENTS

| | | | |
|---|---|---|---|
| 5,321,106 A | 6/1994 | LaPointe | 526/126 |
| 2002/0151661 A1 * | 10/2002 | Suzuki et al. | 526/126 |

FOREIGN PATENT DOCUMENTS

| | | | |
|---|---|---|---|
| EP | 1 170 308 A2 * | 1/2002 | |
| EP | 1 243 598 A1 * | 9/2002 | |
| JP | 58-19309 A | 2/1983 | |
| JP | 61-130314 A | 6/1986 | |
| JP | 1-501950 | 7/1989 | |
| JP | 1-502036 | 7/1989 | |
| JP | 3-179005 A | 8/1991 | |
| JP | 3-179006 | 8/1991 | |
| JP | 3-207703 | 9/1991 | |
| JP | 3-207704 | 9/1991 | |
| JP | 11-199592 A * | 7/1999 | |
| JP | 2000-281710 A | 10/2000 | |

\* cited by examiner

*Primary Examiner*—David W. Wu
*Assistant Examiner*—Rip A. Lee
(74) *Attorney, Agent, or Firm*—Birch, Stewart, Kolasch & Birch, LLP

(57) ABSTRACT

A process for polymerizing an olefin is capable of polymerizing an olefin with excellent polymerization activity, and comprises polymerizing or copolymerizing an olefin at a polymerization reaction temperature of 50 to 200° C. in the presence of a catalyst comprising a transition metal compound (A) represented by the following formula (I), a compound (B-1) having a reduction ability which reacts with the transition metal compound (A) to convert an imine structure moiety to a metal amide structure, and a compound (B-2) which reacts with the transition metal compound (A) to form an ion pair;

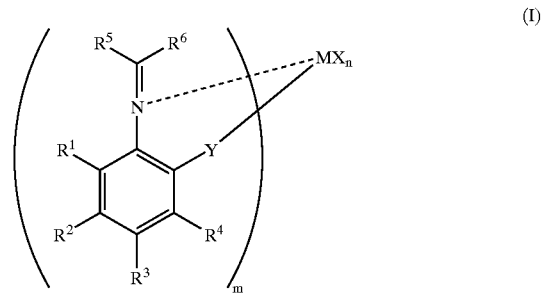

(I)

wherein M is a transition metal atom of Groups 3 to 11 of the periodic table; m is an integer of 1 to 6; Y is O, S, Se, or —C($R^7$)—; $R^1$ to $R^7$ may be the same or different, and are each a hydrogen atom, a halogen atom, a hydrocarbon group, an oxgen-containing group, a nitrogen-containing group and the like; n is a number satisfying a valence of M; and X is a hydrogen atom, a halogen atom, a hydrocarbon group and the like.

3 Claims, 1 Drawing Sheet

Fig. 1

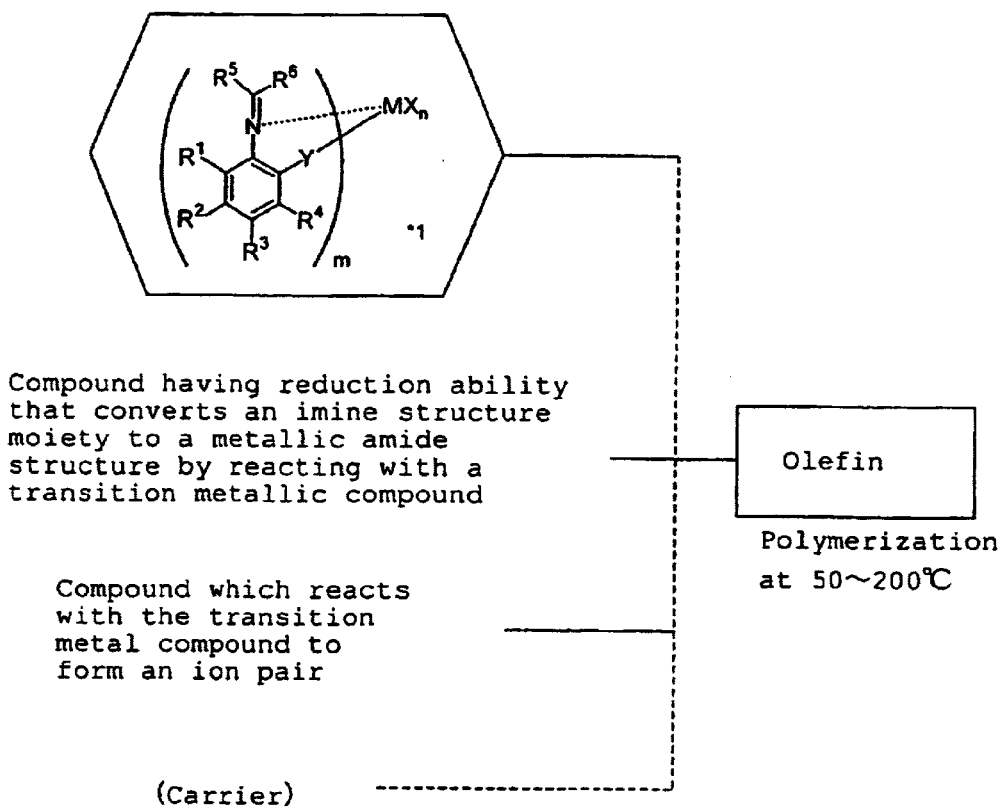

Compound having reduction ability that converts an imine structure moiety to a metallic amide structure by reacting with a transition metallic compound Compound which reacts with the transition metal compound to form an ion pair (Carrier)

Olefin

Polymerization at 50~200°C

*1  M : Transition metal atom selected from Groups 3 to 11 of the periodic table
   m : 1~6
   Y : —O—, —S—, —Se—, —N($R^7$)—
   $R^1$~$R^7$ : hydrogen atom, hydrocarbon group, and the like
   X : halogen atom, oxygen atom, hydrocarbon group, and etc..
   n : number satisfying a valence of M

PROCESS FOR THE POLYMERIZATION OLEFINS

This application is the national phase under 35 U.S.C. § 371 of PCT International Application No. PCT/JP01/05651 which has an International filing date of Jun. 29, 2001, which designated the United States of America.

TECHNICAL FIELD

The present invention relates to a process for polymerizing an olefin, more particularly, a process for polymerizing an olefin in the presence of a specific catalyst under specific conditions.

BACKGROUND ART

As olefin polymerization catalysts, so-called Kaminsky catalysts are well known. The catalysts have extremely high polymerization activity, so that polymers having a narrow molecular weight distribution can be obtained. As the transition metal compounds used for the Kaminsky catalysts, for example, bis(cyclopentadienyl) zirconium chloride (see, JP A 58(1983)-19309) or ethylenebis(4,5,6,7-tetrahydroindenyl) zirconium dichloride (see, JP A 61(1986)-130314) are known.

It is also known that olefin polymerization activity and obtained polyolefin properties differ vastly depending on the type of transition metal compounds used for polymerization.

Further, as a new olefin polymerization catalyst, a transition metal compound having a ligand chelate-coordinating with a hetero atom is recently proposed as described in JP A 11(1999)-199592.

Polyolefins generally have excellent mechanical properties, and hence have widely been employed in various fields such as molded products of all sorts. However, since the demands for physical properties of polyolefins have been diversified recently, polyolefins with various properties have increasingly been desired.

Further, in order to improve productivity, the increase of polyolefin yield per catalyst amount and the maintenance of catalytic activity are especially important subjects.

The present invention has been made in view of the above circumstances of the prior art. An object of the present invention is to provide a process for polymerizing an olefin with excellent polymerization activity using the transition metal compound proposed in JP A 11(1999)-199592.

DISCLOSURE OF THE INVENTION

The process for polymerizing an olefin of the present invention comprises polymerizing an olefin or copolymerizing olefins at a polymerization reaction temperature of 50 to 200° C. in the presence of an olefin polymerization catalyst comprising:

(A) a transition metal compound represented by the following formula (I), (B-1) a compound having a reduction ability which reacts with the transition metal compound (A) to convert an imine structure moiety to a metal amide structure, and (B-2) a compound which reacts with the transition metal compound (A) to form an ion pair;

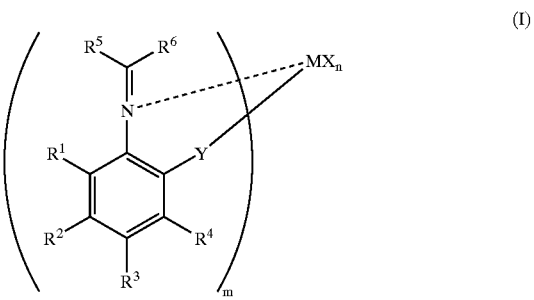

wherein M is a transition metal atom of Groups 3 to 11 of the periodic table, m is an integer of 1 to 6, Y is an oxygen atom, a sulfur atom or a selenium atom, or a nitrogen atom having a substituent $R^7$, $R^1$ to $R^7$ may be the same or different, they are each a hydrogen atom, a halogen atom, a hydrocarbon group, an oxygen-containing group, a nitrogen-containing group, a boron-containing group, a sulfur-containing group, a phosphorus-containing group, a heterocyclic compound residual group, a silicon-containing group, a germanium-containing group or a tin-containing group, two or more of them may be bonded to each other to form a ring except for the case where $R^1$ and $R^5$ or $R^1$ and $R^6$ are bonded to each other to form an aromatic ring, and when m is 2 or greater, one group of $R^1$ to $R^7$ contained in one ligand and one group of $R^1$ to $R^7$ contained in other ligands may be bonded, and $R^1$s, $R^2$s, $R^3$s, $R^4$s, $R^5$s, $R^6$s and $R^7$s may be the same or different, n is a number satisfying a valence of M, and X is a hydrogen atom, a halogen atom, a hydrocarbon group, an oxygen-containing group, a nitrogen-containing group, a boron-containing group, a sulfur-containing group, a phosphorus-containing group, a halogen-containing group, an aluminum-containing group, a heterocyclic compound residual group, a silicon-containing group, a germanium-containing group or a tin-containing group, and when n is 2 or greater, plural groups indicated by X may be the same or different, and they may be bonded to each other to form a ring.

In this invention, the transition metal compound (A) is preferably a compound in which $R^4$ in the above formula (I) is a halogen atom, a hydrocarbon group, an oxygen-containing group, a nitrogen-containing group, a boron-containing group, a sulfur-containing group, a phosphorus-containing group, a heterocyclic compound residual group, a silicon-containing group, a germanium-containing group or a tin-containing group.

The olefin polymerization catalyst used in the invention may further comprise a carrier (C), in addition to the transition metal compound (A), the compound (B-1) having a reduction ability which reacts with the compound (A) to convert an imine structure moiety to a metal amide structure, and a compound (B-2) which reacts with the compound (A) to form an ion pair.

According to the process for polymerizing an olefin of the invention, the yield of polyolefin per 1 mol of a transition metal atom contained in the transition metal compound (A) and 1 hour of a polymerization time is 1000 kg or more.

BRIEF DESCRIPTION OF THE DRAWING

FIG. 1 is an explanatory diagram showing the preparation process of an olefin polymerization catalyst used in the present invention.

BEST MODE FOR CARRYING OUT THE INVENTION

The process for polymerizing an olefin according to the present invention is described below in more detail.

The term "polymerization" used herein means not only homopolymerization but also copolymerization, and also the term "polymer" used herein means not only homopolymer but also copolymer.

The process for polymerizing an olefin of the present invention comprises polymerizing an olefin in the presence of an olefin polymerization catalyst comprising:

(A) a transition metal compound represented by the following formula (I), (B-1) a compound having a reduction ability which reacts with the transition metal compound (A) to convert an imine structure moiety to a metal amide structure, and (B-2) a compound which reacts with the transition metal compound (A) to form an ion pair.

First, each of components forming the olefin polymerization catalyst used in the present invention is explained.

(A) Transition Metal Compound

The transition metal compound (A) is a compound represented by the following formula (I);

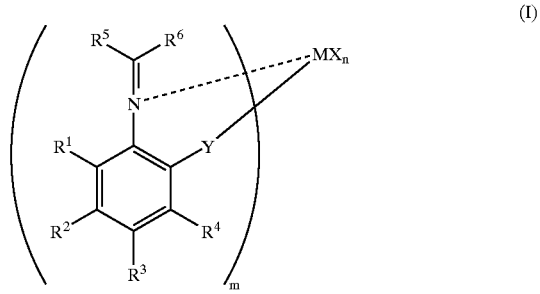

(I)

wherein N—M is generally taken as coordination, but it is not necessarily the case for this compound.

In the formula (I), M is a transition metal atom of Groups 3 (including lanthanoid) to 11 of the periodic table, preferably a transition metal atom of Groups 4 to 11, more preferably a transition metal atom of Groups 4 to 6 and Groups 8 to 11, particularly preferably a transition metal atom of Group 4 or Group 5. Examples of such metal atoms include scandium, yttrium, lanthanoid atom, titanium, zirconium, hafnium, vanadium, niobium, tantalum, chromium, molybdenum, tungsten, manganese, rhenium, iron, ruthenium, cobalt, rhodium, nickel and palladium. Preferable are titanium, zirconium, hafnium, vanadium, niobium, tantalum, chromium, iron, cobalt, rhodium, nickel, palladium and copper. More preferable are titanium, zirconium, hafnium, vanadium, niobium, tantalum, chromium, iron, cobalt and rhodium. Particularly preferable are titanium, zirconium and hafnium.

m is an integer of 1 to 6, preferably 1 to 4, more preferably 1 to 2.

Y is an oxygen atom (—O—), a sulfur atom (—S—) or a selenium atom (—Se—), or a nitrogen atom having a substituent $R^7$ (—N($R^7$)—).

$R^1$ to $R^7$ may be the same or different. They are each a hydrogen atom, a halogen atom, a hydrocarbon group, an oxygen-containing group, a nitrogen-containing group, a boron-containing group, a sulfur-containing group, a phosphorus-containing group, a heterocyclic compound residual group, a silicon-containing group, a germanium-containing group or a tin-containing group, and two or more of them may be bonded to each other to form a ring except for the case where $R^1$ and $R^5$ or $R^1$ and $R^6$ are bonded to form an aromatic ring.

The halogen atom is fluorine, chlorine, bromine or iodine.

Examples of the hydrocarbon groups include straight-chain or branched alkyl groups of 1 to 30 carbon atoms, preferably 1 to 20 carbon atoms, such as methyl, ethyl, n-propyl, isopropyl, n-butyl, isobutyl, sec-butyl, tert-butyl, neopentyl and n-hexyl; straight-chain or branched alkenyl groups of 2 to 30 carbon atoms, preferably 2 to 20 carbon atoms, such as vinyl, allyl and isopropenyl; straight-chain or branched alkynyl groups of 2 to 30 carbon atoms, preferably 2 to 20 carbon atoms, such as ethynyl and propargyl; cyclic saturated hydrocarbon groups of 3 to 30 carbon atoms, preferably 3 to 20 carbon atoms, such as cyclopropyl, cyclobutyl, cyclopentyl, cyclohexyl and adamantyl; cyclic unsaturated hydrocarbon groups of 5 to 30 carbon atoms, such as cyclopentadienyl, indenyl and fluorenyl; aryl groups of 6 to 30 carbon atoms, preferably 6 to 20 carbon atoms, such as phenyl, benzyl, naphthyl, biphenylyl, terphenylyl, phenanthryl and anthryl; and alkyl-substituted aryl groups, such as tolyl, isopropylphenyl, tert-butylphenyl, dimethylphenyl, di-tert-butylphenyl and trimethylphenyl.

Th above hydrocarbon groups may be ones in which a hydrogen atom is substituted with a halogen atom. Examples thereof include halogenated hydrocarbon groups of 1 to 30 carbon atoms, preferably 1 to 20 carbon atoms, such as trifluoromethyl, perfluoro-tert-butyl, pentafluorophenyl, chlorophenyl and trifluoromethylphenyl.

Further, the above hydrocarbon groups may be ones wherein a hydrogen atom is substituted with other hydrocarbon group. Examples thereof include aryl substituted alkyl groups, such as benzyl and cumyl.

Furthermore, the above hydrocarbon groups may have heterocyclic compound residual groups; oxygen-containing groups, such as an alkoxy group, an aryloxy group, an ester group, an ether group, an acyl group, a carboxyl group, a carbonate group, a hydroxyl group, a peroxy group and a carboxylic anhydride group; nitrogen-containing groups, such as an amino group, an imino group, an amido group, an imido group, a hydrazino group, a hydrazono group, a nitro group, a nitroso group, a cyano group, an isocyano group, a cyanic ester group, an amidino group, a diazo group and an ammonium salt group derived from an amino group; boron-containing groups, such as a boranediyl group, a boranetriyl group and a diboranyl group; sulfur-containing groups, such as a mercapto group, a thioester group, a dithioester group, an alkylthio group, an arylthio group, a thioacyl group, a thioether group, a thiocyanic ester group, an isothiocyanic ester group, a sulfonic ester group, a sulfonamido group, a thiocarboxyl group, a dithiocarboxyl group, a sulfo group, a sulfonyl group, a sulfinyl group and a sulfenyl group; phosphorus-containing groups, such as a phosphido group, a phosphoryl group, a thiophosphoryl group and a phosphate group; silicon-containing groups; germanium-containing groups; or tin-containing groups.

Of these, preferable are straight-chain or branched alkyl groups of 1 to 30 carbon atoms, preferably 1 to 20 carbon atoms, such as methyl, ethyl, n-propyl, isopropyl, n-butyl, isobutyl, sec-butyl, tert-butyl, neopentyl and n-hexyl; aryl groups of 6 to 30 carbon atoms, preferably 6 to 20 carbon atoms, such as phenyl, naphthyl, biphenylyl, terphenylyl, phenanthryl and anthryl; and substituted aryl groups wherein the above aryl groups are substituted with 1 to 5 substituent groups such as halogen atoms, alkyl groups of 1 to 30 carbon atoms, preferably 1 to 20 carbon atoms, alkoxy groups of 1 to 30 carbon atoms, preferably 1 to 20 carbon atoms, aryl groups of 6 to 30 carbon atoms, preferably 6 to 20 carbon atoms, and aryloxy groups of 6 to 30 carbon atom, preferably 6 to 20 carbon atoms.

Examples of the oxygen-containing groups, nitrogen-containing groups, boron-containing groups, sulfur-containing groups and phosphorus-containing groups indicated by $R^1$ to $R^7$ include those previously described as substituents which may be contained in the hydrocarbon groups.

The heterocyclic compound residual groups are cyclic groups having 1 to 5 hetero atoms, such as O, N, S, P and B. Employable are monocyclic rings and polycyclic rings of 4 to 7 members, preferably 5 to 6 members. Examples of the heterocyclic compound residual groups include residual groups of nitrogen-containing compounds (e.g., pyrrole, pyridine, pyrimidine, quinoline and triazine), residual groups of oxygen-containing compounds (e.g., furan and pyran), residual groups of sulfur-containing compounds (e.g., thiophene), and groups wherein these heterocyclic compound residual groups are further substituted with substituents such as alkyl groups of 1 to 30 carbon atoms, preferably 1 to 20 carbon atoms, and alkoxy groups of 1 to 30 carbon atoms, preferably 1 to 20 carbon atoms.

The silicon-containing groups include a silyl group, a siloxy group, a hydrocarbon-substituted silyl group and a hydrocarbon-substituted siloxy group. Examples of the silyl groups include methylsilyl, dimethylsilyl, trimethylsilyl, ethylsilyl, diethylsilyl, triethylsilyl, diphenylmethylsilyl, triphenylsilyl, dimethylphenylsilyl, dimethyl-tert-butylsilyl and dimethyl(pentafluorophenyl)silyl. Of these, preferable are methylsilyl, dimethylsilyl, trimethylsilyl, ethylsilyl, diethylsilyl, triethylsilyl, dimethylphenylsilyl and triphenylsilyl. Particularly preferable are trimethylsilyl, triethylsilyl, triphenylsilyl and dimethylphenylsilyl. Examples of the hydrocarbon-substituted siloxy groups are trimethylsiloxy and the like.

Examples of the germanium-containing groups and the tin-containing groups include those wherein silicon of the above silicon-containing group is substituted with germanium or tin.

Examples of $R^1$ to $R^7$ mentioned above are described below in more detail.

Of the oxygen-containing groups, preferred alkoxy groups are methoxy, ethoxy, n-propoxy, isopropoxy, n-butoxy, isobutoxy and tert-butoxy; preferred aryloxy groups are phenoxy, 2,6-dimethylphenoxy and 2,4,6-trimethylphenoxy; preferred acyl groups are formyl, acetyl, benzoyl, p-chlorobenzoyl and p-methoxybenzoyl; and preferred ester groups are acetyloxy, benzoyloxy, methoxycarbonyl, phenoxycarbonyl and p-chlorophenoxycarbonyl.

Of the nitrogen-containing groups, preferred amido groups are acetamido, N-methylacetamido and N-methylbenzamido; preferred amino groups are dimethylamino, ethylmethylamino and diphenylamino; preferred imido groups are acetimido and benzimido; and preferred imino groups are methylimino, ethylimino, propylimino, butylimino and phenylimino.

Of the sulfur-containing groups, preferred alkylthio groups are methylthio and ethylthio; preferred arylthio groups are phenylthio, methylphenylthio and naphthylthio; preferred thioester groups are acetylthio, benzoylthio, methylthiocarbonyl and phenylthiocarbonyl; preferred sulfonic ester groups are methylsulfonato, ethylsulfonato and phenylsulfonato; and preferred sulfonamido groups are phenylsulfonamido, N-methylsulfonamido and N-methyl-p-toluenesulfonamido.

$R^1$ to $R^7$ are preferably a hydrogen atom, a halogen atom, a hydrocarbon group, a heterocyclic compound residual group, a hydrocarbon-substituted silyl group, a hydrocarbon-substituted siloxy group, an alkoxy group, an alkylthio group, an arylthio group, an acyl group, an ester group, a thioester group, an amido group, an imido group, an amino group, an imino group, a sulfonic acid amido group, a cyano group, a nitro group, a carboxyl group, a sulfo group, a mercapto group or a hydroxyl group.

When Y is an oxygen atom, a sulfur atom or a selenium atom, $R^4$ is preferably a substituent other than hydrogen. Specifically, $R^4$ is preferably a halogen atom, a hydrocarbon group, an oxygen-containing group, a nitrogen-containing group, a sulfur-containing group, a boron-containing group, a heterocyclic compound residual group, a silicon-containing group, a germanium-containing group or a tin-containing group. $R^4$ is particularly preferably a halogen atom, a hydrocarbon group, a heterocyclic compound residual group, a hydrocarbon-substituted silyl group, a hydrocarbon-substituted siloxy group, an alkoxy group, an alkylthio group, an arylthio group, an aryloxy group, an acyl group, an ester group, a thioester group, an amido group, an imido group, an imino group, a sulfonic ester group, a sulfonamide group, a cyano group, a nitro group, or a hydroxyl group.

When Y is an oxygen atom, a sulfur atom or a selenium atom, preferable examples of hydrocarbon groups as $R^4$ include straight-chain or branched alkyl groups of 1 to 30 carbon atoms, preferably 1 to 20 carbon atoms, such as methyl, ethyl, n-propyl, Isopropyl, n-butyl, isobutyl, sec-butyl, tert-butyl, neopentyl and n-hexyl; cyclic saturated hydrocarbon groups of 3 to 30 carbon atoms, preferably 3 to 20 carbon atoms, such as cyclopropyl, cyclobutyl, cyclopentyl, cyclohexyl and adamantyl; aryl groups of 6 to 30 carbon atoms, preferably 6 to 20 carbon atoms, such as phenyl, naphthyl, biphenylyl and terphenylyl; and these groups may be further substituted with substituents such as an alkyl group of 1 to 30 carbon atoms, preferably 1 to 20 carbon atoms, an alkoxy group of 1 to 30 carbon atoms, preferably 1 to 20 carbon, a halogenated alkyl group of 1 to 30 carbon atoms, preferably 1 to 20 carbon atoms, an aryl group of 6 to 30 carbon atoms, preferably 6 to 20 carbon atoms and an aryloxy group of 6 to 30 carbon atoms, preferably 6 to 20 carbon atoms.

When Y is an oxygen atom, a sulfur atom or a selenium atom, preferable examples of hydrocarbon-substituted silyl groups as $R^4$ include methylsilyl, dimethylsilyl, trimethylsilyl, ethylsilyl, diethylsilyl, triethylsilyl, diphenylmethylsilyl, triphenylsilyl, dimethylphenylsilyl, dimethyl-tert-butylsilyl and dimethyl (pentafluorophenyl) silyl. Particularly preferable are trimethylsilyl, triethylsilyl, diphenylethylsilyl, isophenylsilyl, dimethylphenylsilyl, dimethyl-tert-butylsilyl, and dimethyl(pentafluorophenyl) silyl.

Two or more groups of $R^1$ to $R^7$, preferably adjacent groups, may be bonded to each other to form an aliphatic ring, an aromatic ring or a hydrocarbon group containing a hetero atom such as a nitrogen atom except for the case where $R^1$ and $R^5$ or $R^1$ and $R^6$ are bonded to each other to form an aromatic ring, and these rings may further contain a substituent.

When m is 2 or greater, one group of $R^1$ to $R^7$ contained in one ligand and one group of $R^1$ to $R^7$ contained in other ligand(s) may be bonded. When $R^5$s, $R^6$s or $R^7$s are bonded to each other, the main chain of the bond is preferably composed of 3 or more atoms. Further, $R^1$s, $R^2$s, $R^3$s, $R^4$s, $R^5$s, $R^6$s or $R^7$s may be the same or different.

n is a number satisfying a valence of M, specifically 0 to 5, preferably 1 to 4, more preferably 1 to 3.

X is a hydrogen atom, a halogen atom, a hydrocarbon group, an oxygen-containing group, a nitrogen-containing group, a boron-containing group, a sulfur-containing group, a phosphorus-containing group, a halogen-containing group, an aluminum-containing group, a heterocyclic compound residual group, a silicon-containing group, a germanium-containing group or a tin-containing group.

The halogen atoms include fluorine, chlorine, bromine and iodine.

Examples of the hydrocarbon groups include the same groups as previously described with respect to $R^1$ to $R^7$. Specifically, there can be mentioned alkyl groups, such as methyl, ethyl, propyl, butyl, hexyl, octyl, nonyl, dodecyl and eicosyl; cycloalkyl groups of 3 to 30 carbon atoms, such as cyclopentyl, cyclohexyl, norbornyl and adamantyl; alkenyl groups, such as vinyl, propenyl and cyclohexenyl; arylalkyl groups, such as benzyl, phenylethyl and phenylpropyl; and aryl groups, such as phenyl, tolyl, dimethylphenyl, trimethylphenyl, ethylphenyl, propylphenyl, biphenyl, naphthyl, methylnaphthyl, anthryl and phenanthryl. The hydrocarbon groups may also include halogenated hydrocarbon groups, specifically, those of 1 to 20 carbon atoms in which at least one hydrogen is substituted with halogen.

Of these, preferable are hydrocarbon groups of 1 to 20 carbon atoms.

Examples of the oxygen-containing groups include the same groups as previously described with respect to $R^1$ to $R^7$. Specifically, there can be mentioned a hydroxyl group; alkoxy groups, such as methoxy, ethoxy, propoxy and butoxy; aryloxy groups, such as phenoxy, methylphenoxy, dimethylphenoxy and naphthoxy; arylalkoxy groups, such as phenylmethoxy and phenylethoxy; an acetoxy group; and a carbonyl group.

Examples of the nitrogen-containing groups include the same groups as previously described with respect to $R^1$ to $R^7$. Specifically, there can be mentioned an amino group; alkylamino groups, such as methylamino, dimethylamino, diethylamino, dipropylamino, dibutylamino and dicyclohexylamino; and arylamino or alkylarylamino groups, such as phenylamino, diphenylamino, ditolylamino, dinaphthylamino and methylphenylamino.

Examples of the boron-containing groups include $BR_4$ (R is hydrogen, an alkyl group, an aryl group which may have a substituent, a halogen atom or the like).

Examples of the sulfur-containing groups include the same groups as previously described with respect to $R^1$ to $R^7$. Specifically, there can be mentioned sulfonato groups, such as methylsulfonato, trifluoromethanesulfonato, phenylsulfonato, benzylsulfonato, p-toluenesulfonato, trimethylbenzenesulfonato, triisobutylbenzenesulfonato, p-chlorobenzenesulfonato and pentafluorobenzenesulfonato; sulfinato groups, such as methylsulfinato, phenylsulfinato, benzylsulfinato, p-toluenesulfinato, trimethylbenzenesulfinato and pentafluorobenzenesulfinato; and alkylthio groups.

Examples of the phosphorus-containing groups include trialkylphosphine groups, such as trimethylphosphine, tributylphosphine and tricyclohexylphosphine; triarylphosphine groups, such as triphenylphosphine and tritolylphosphine; phosphite groups (phosphido groups), such as methylphosphite, ethylphosphite and phenylphosphite; a phosphonic acid group; and a phosphine group.

Examples of the halogen-containing groups include fluorine-containing groups, such as $PF_6$ and $BF_4$; chlorine-containing groups, such as $ClO_4$ and $SbCl_6$; and iodine-containing groups, such as $IO_4$.

Examples of the aluminum-containing groups include $AlR_4$ (R is hydrogen, an alkyl group, an aryl group which may have a substituent, a halogen atom or the like).

Examples of the heterocyclic compound residual groups include the same groups as previously described with respect to $R^1$ to $R^7$.

Examples of the silicon-containing groups include the same groups as previously described with respect to $R^1$ to $R^7$. Specifically, there can be mentioned hydrocarbon-substituted silyl groups, such as phenylsilyl, diphenylsilyl, trimethylsilyl, triethylsilyl, tripropylsilyl, tricyclohexylsilyl, triphenylsilyl, methyldiphenylsilyl, tritolylsilyl and trinaphthylsilyl; hydrocarbon-substituted silyl ether groups, such as trimethylsilyl ether; silicon-substituted alkyl groups, such as trimethylsilylmethyl; and silicon-substituted aryl groups, such as trimethylsilylphenyl.

Examples of the germanium-containing groups include the same groups as previously described with respect to $R^1$ to $R^7$. Specifically, there can be mentioned groups wherein silicon in the aforesaid silicon-containing groups is substituted with germanium.

Examples of the tin-containing groups include the same groups as previously described with respect to $R^1$ to $R^7$. Specifically, there can be mentioned groups wherein silicon in the aforesaid silicon-containing groups is substituted with tin.

When n is 2 or greater, plural groups indicated by X may be the same or different, and they may be bonded to each other to form a ring.

The transition metal compound (A) represented by the formula (I) wherein m is 2 and one group of $R^1$ to $R^7$ contained in one ligand and one group of $R^1$ to $R^7$ contained in another ligand are bonded is, for example, a compound represented by the following formula (I-a).

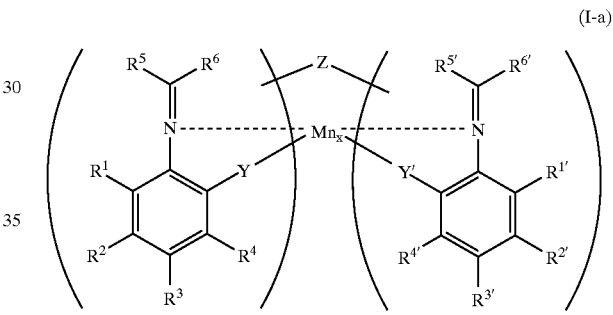

(I-a)

In the above formula (I-a), M, Y, $R^1$ to $R^7$ and X have the same meanings as those of M, Y, $R^1$ to $R^7$ and X in the formula (I).

Y' may be the same as or different from Y, and is an oxygen atom (—O—), a sulfur atom (—S—), a selenium atom (—Se—) or a nitrogen atom having a substituent $R^{7'}$ (—N($R^{7'}$)—).

$R^{1'}$ to $R^{7'}$ may be the same or different and have the same meanings as those of $R^1$ to $R^7$. Two or more groups of $R^{1'}$ to $R^{7'}$, preferably adjacent groups, may be bonded to each other to form an aliphatic ring, an aromatic ring or a hydrocarbon ring containing a hetero atom such as a nitrogen atom except for the case where $R^{1'}$ and $R^{5'}$ or $R^{1'}$ and $R^{6'}$ are bonded to each other to form an aromatic ring in the formula (I-a).

Z is a bonding group for linking at least one group selected from $R^1$ to $R^7$ to at least one group selected from $R^{1'}$ to $R^{7'}$ or a single bond. The bonding group is not specifically limited, but it preferably has a structure containing the main chain composed of 3 or more atoms, preferably 4 to 20 atoms, particularly preferably 4 to 10 atoms. The bonding group may have a substituent.

The bonding group Z is specifically a group containing at least one element selected from oxygen, sulfur, carbon, nitrogen, phosphorus, silicon, selenium, tin and boron. Examples of such groups include chalcogen atom-containing groups, such as —O—, —S— and —Se—; nitrogen or phosphorus atom-containing groups, such as —NH—, —N(CH$_3$)—, —PH— and —P(CH$_3$)—; hydrocarbon groups of 1 to 20 carbon atoms, such as —CH$_2$—, —CH$_2$—CH$_2$— and —C(CH$_3$)$_2$—; cyclic unsaturated hydrocarbon residual groups of 6 to 20 carbon atoms, such as benzene, naphthalene and anthracene; residual groups of heterocyclic compounds of 3 to 20 carbon atoms and containing hetero atoms, such as pyridine, quinoline, thiophene and furan; silicon-atom containing groups, such as —SiH$_2$— and —Si(CH$_3$)$_2$—; tin atom-containing groups, such as —SnH$_2$— and —Sn(CH$_3$)$_2$—; and boron atom-containing groups, such as —BH—, —B(CH$_3$)— and —BF—. Z can also be a single bond.

Examples of the transition metal compound represented by the formula (I) are mentioned below, but not limited thereto.

In the specific examples, M is a transition metal atom of Groups 3 to 11 of the periodic table. Examples thereof include scandium, yttrium, lanthanoid atoms, titanium, zirconium, hafnium, vanadium, niobium, tantalum, chromium, molybdenum, tungsten, manganese, rhenium, iron, ruthenium, cobalt, rhodium, nickel and palladium. Of these, preferable are titanium, zirconium, hafnium, vanadium, niobium, tantalum, chromium, iron, cobalt and rhodium. More preferable are titanium, zirconium and hafnium.

X is halogen such as Cl and Br, or an alkyl group such as methyl. When plural Xs are present, they may be the same or different.

n is decided by a valence of the metal M. For example, when two kinds of mono-anionic species are bonded to a metal, n=0 in the case of a divalent metal, n=1 in case of a trivalent metal, n=2 in the case of a tetravalent metal, and n=3 in the case of a pentavalent metal. More specifically, n=2 in the case that the metal is Ti(IV), n=2 in the case of Zr(IV), and n=2 in the case of Hf(IV).

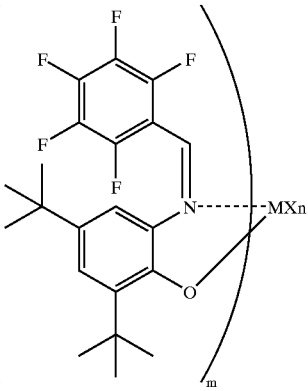

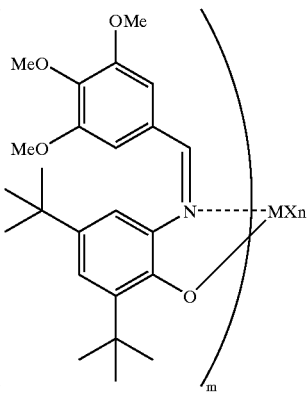

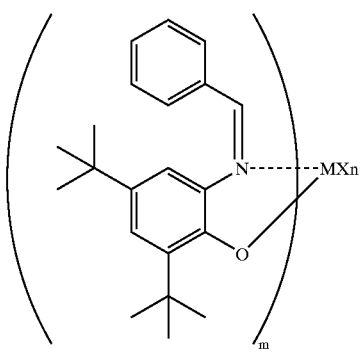

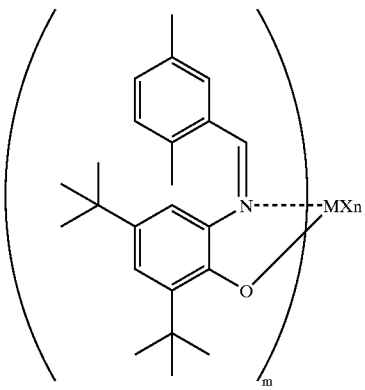

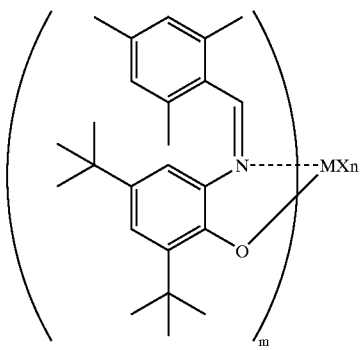

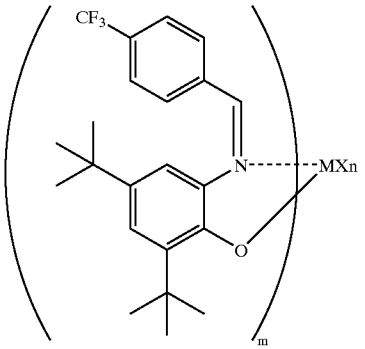

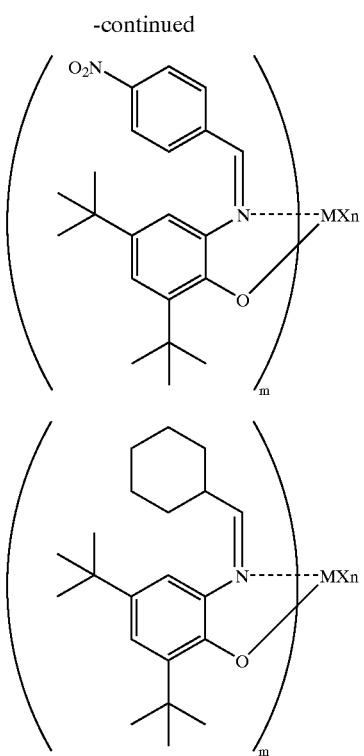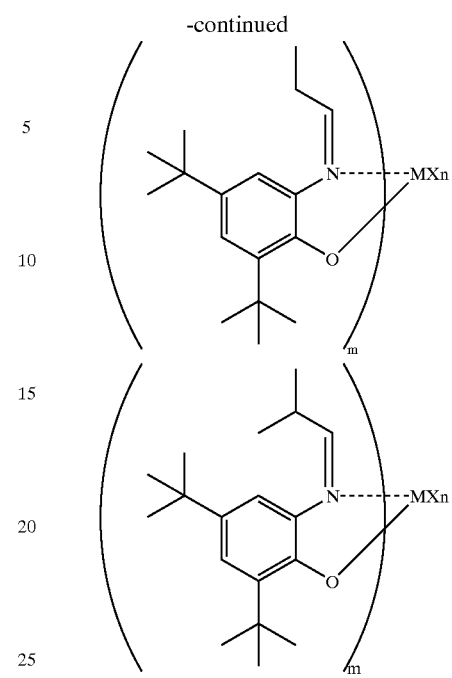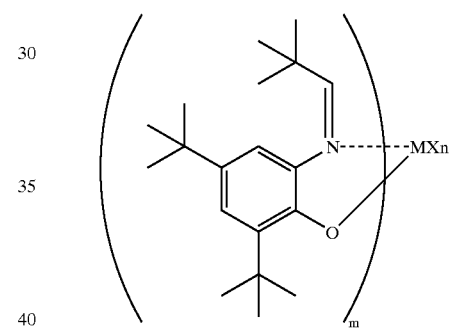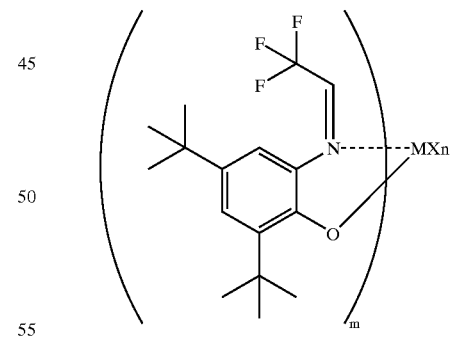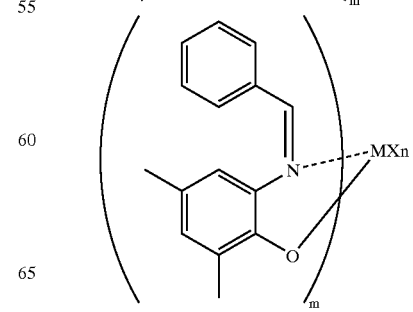

-continued
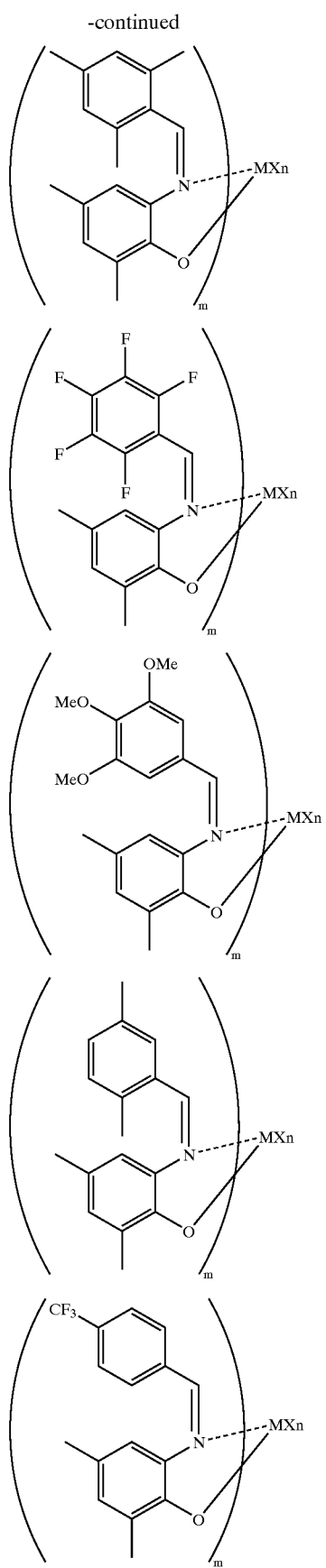
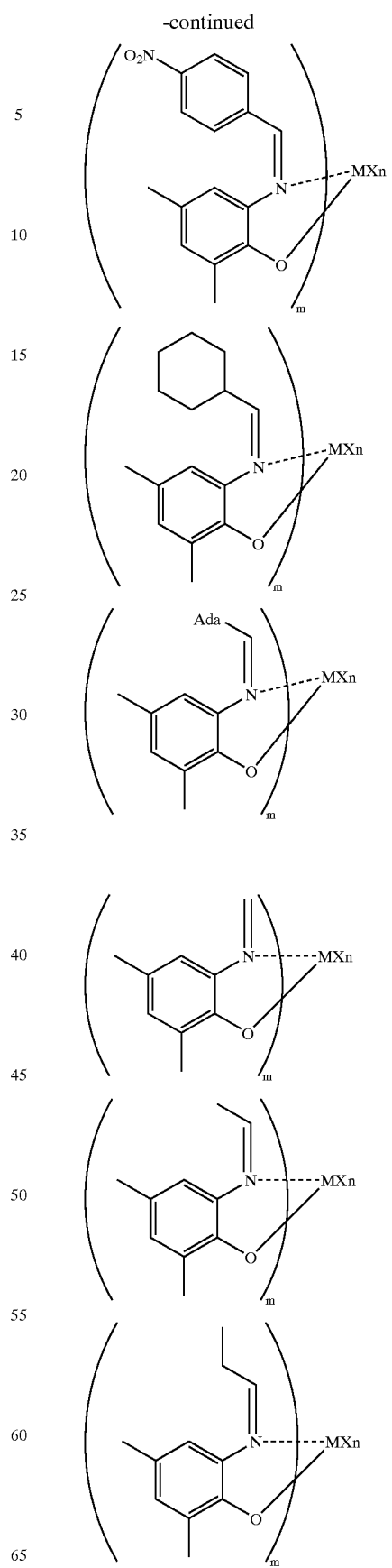

-continued
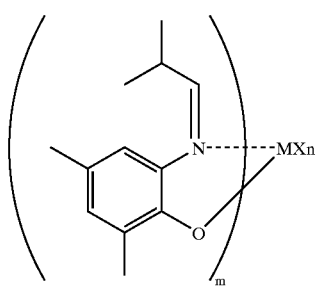
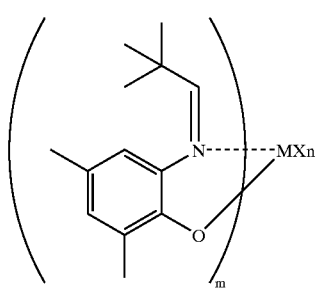
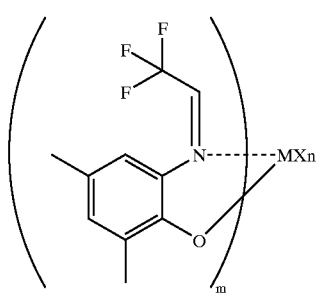
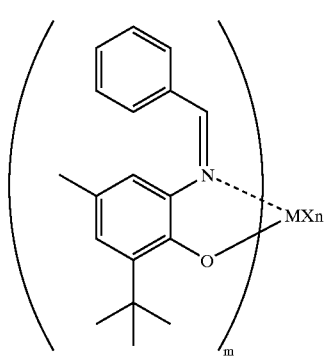
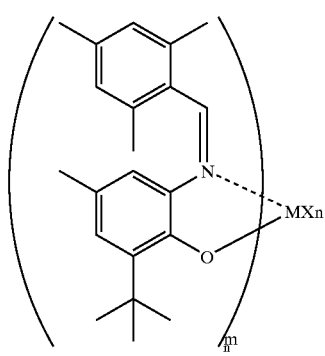
-continued
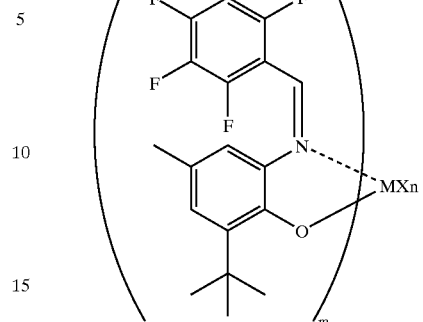
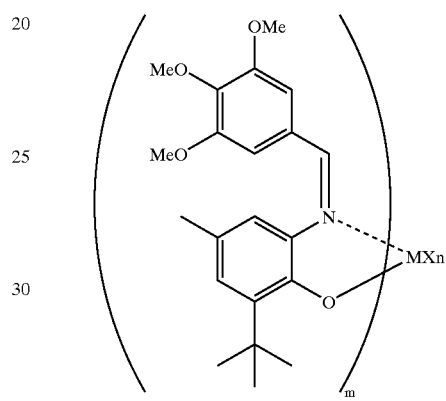
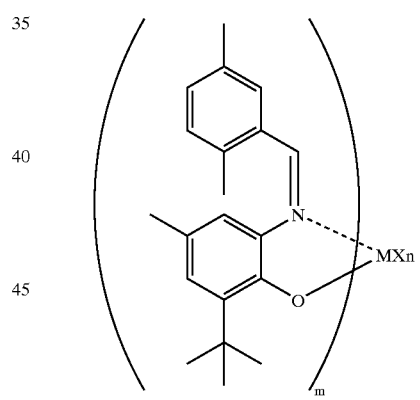
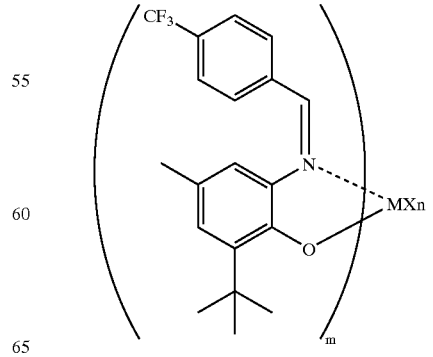

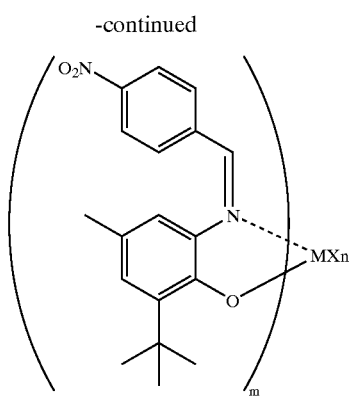
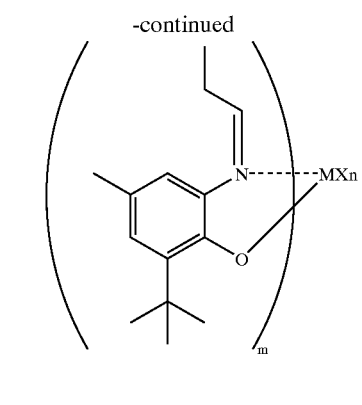
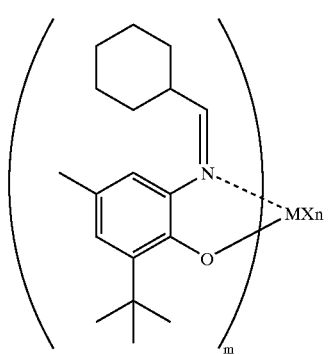
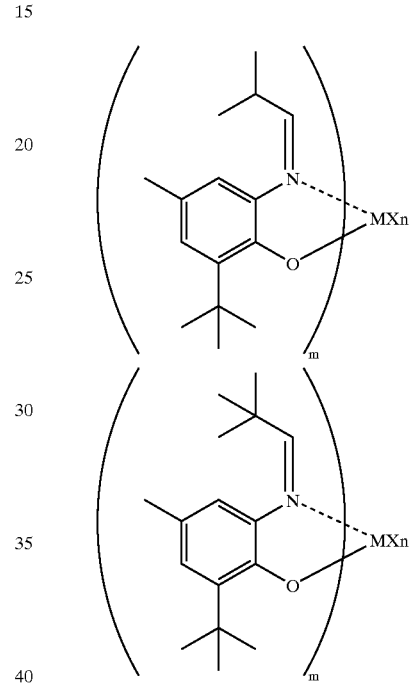
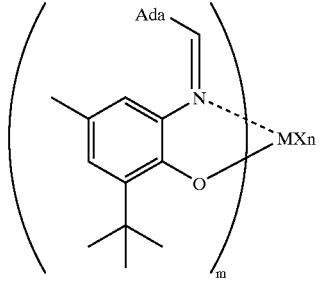
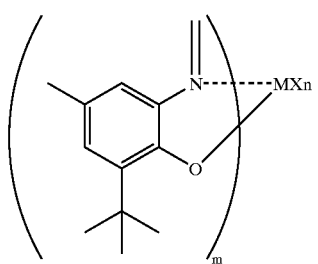
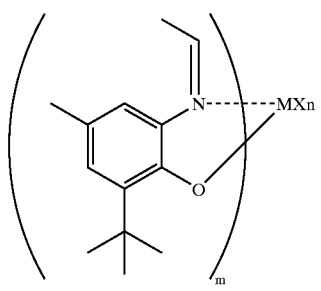
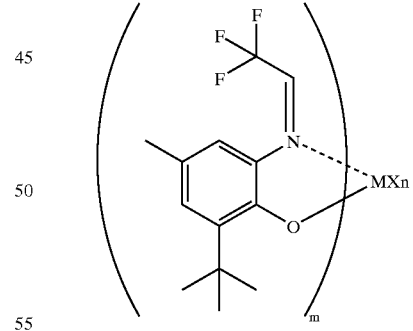
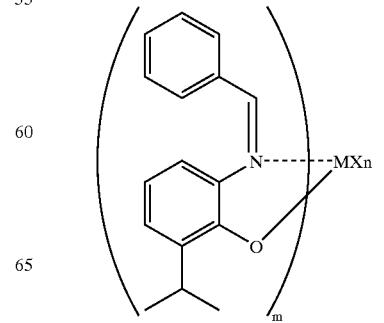

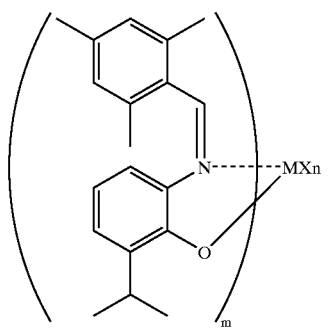
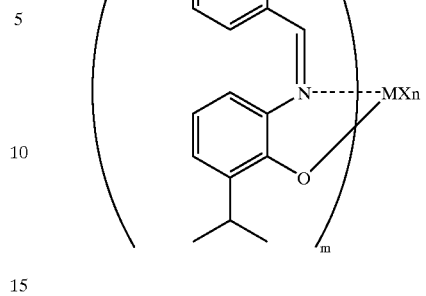
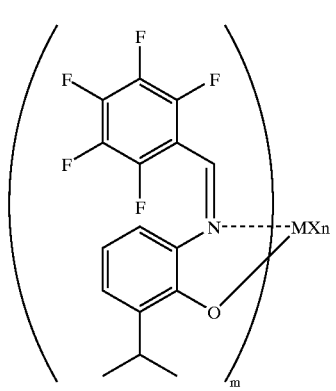
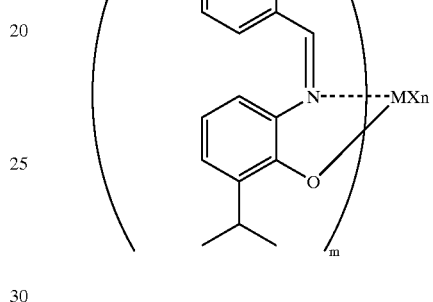
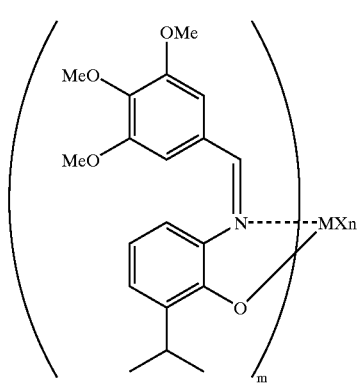
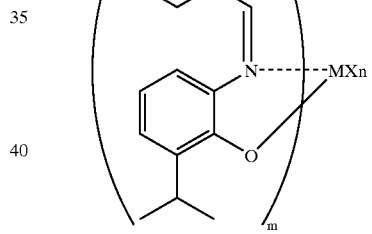
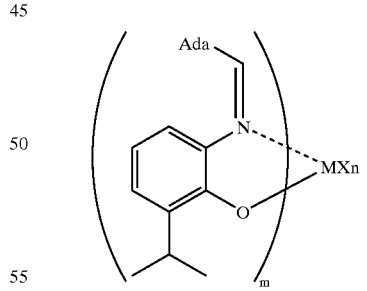
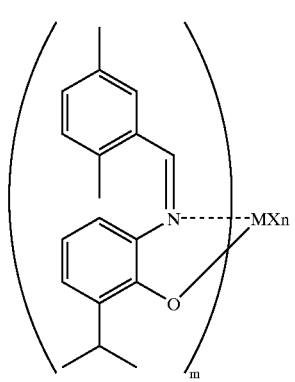
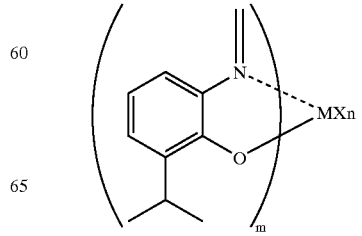

-continued
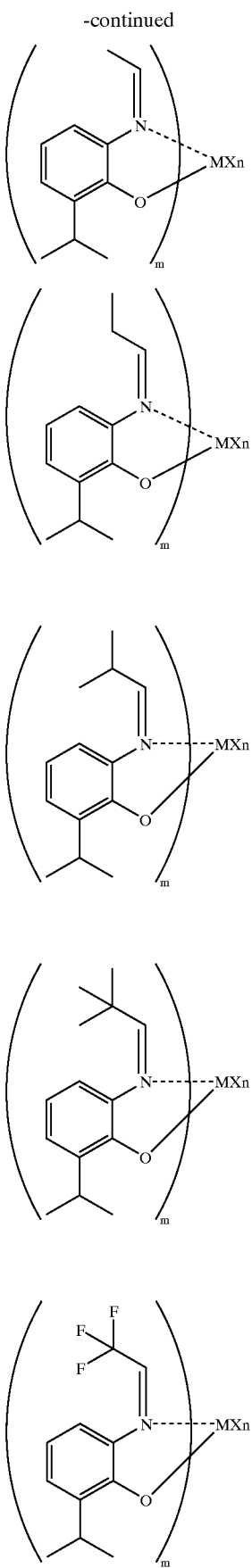
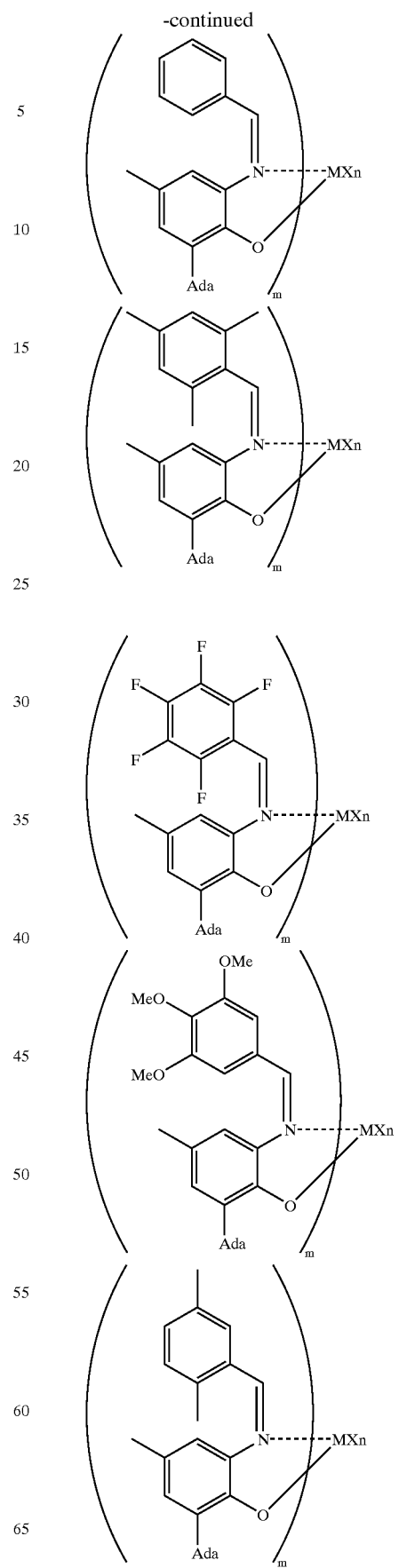

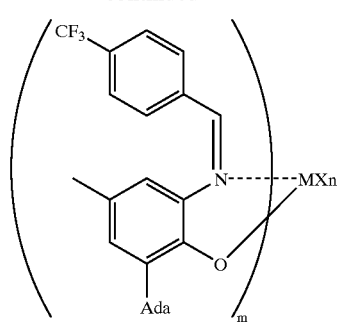
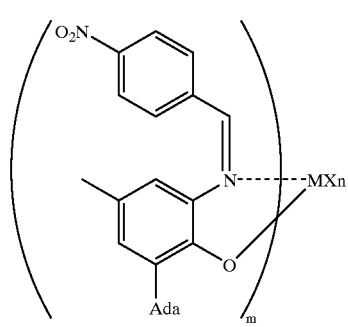
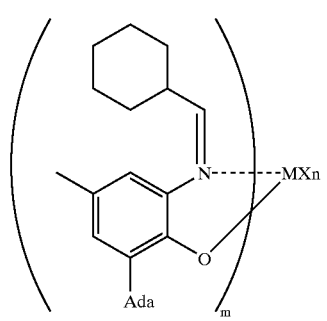
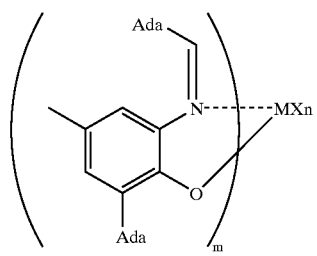
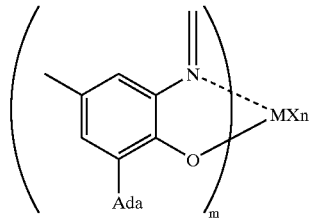
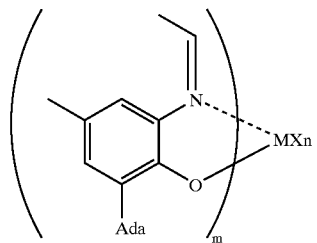
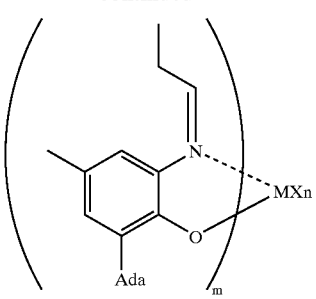
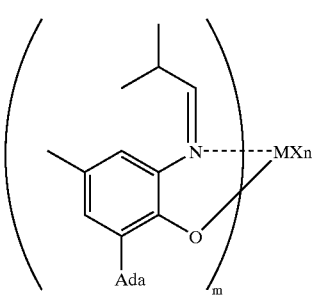
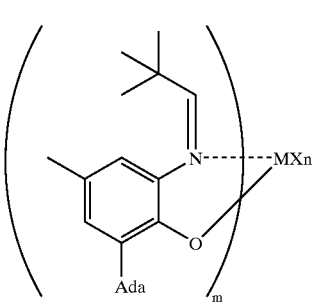
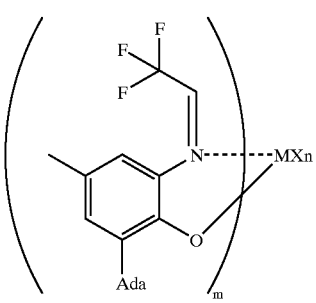
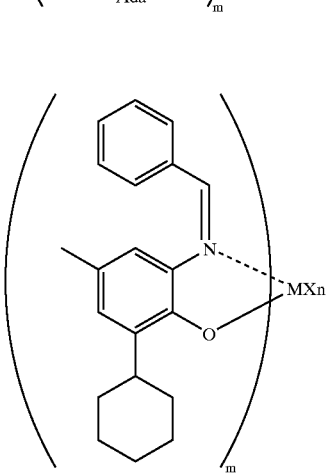

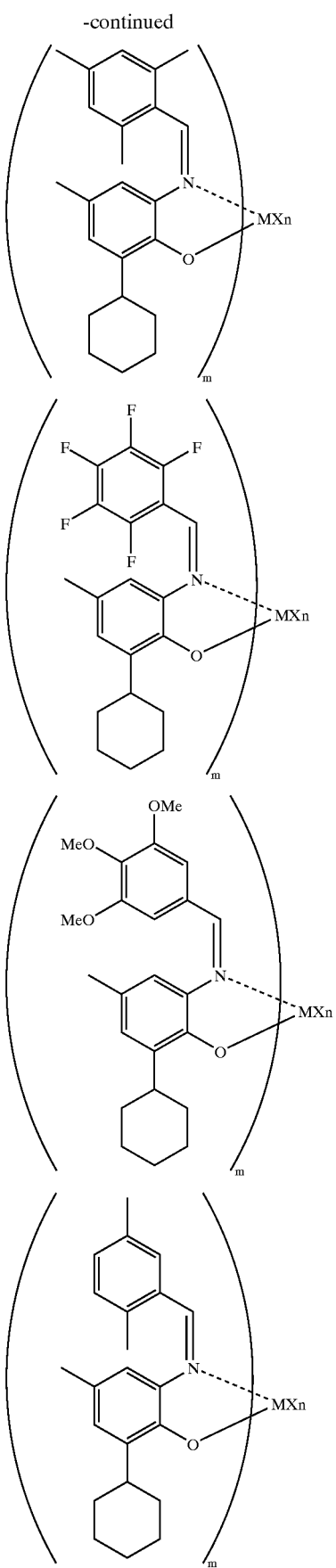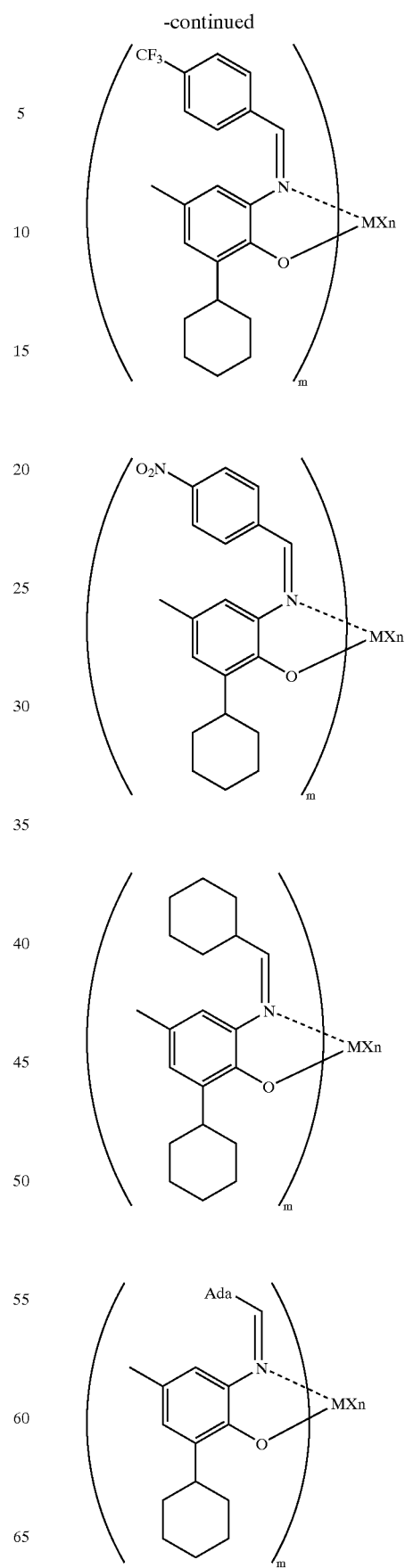

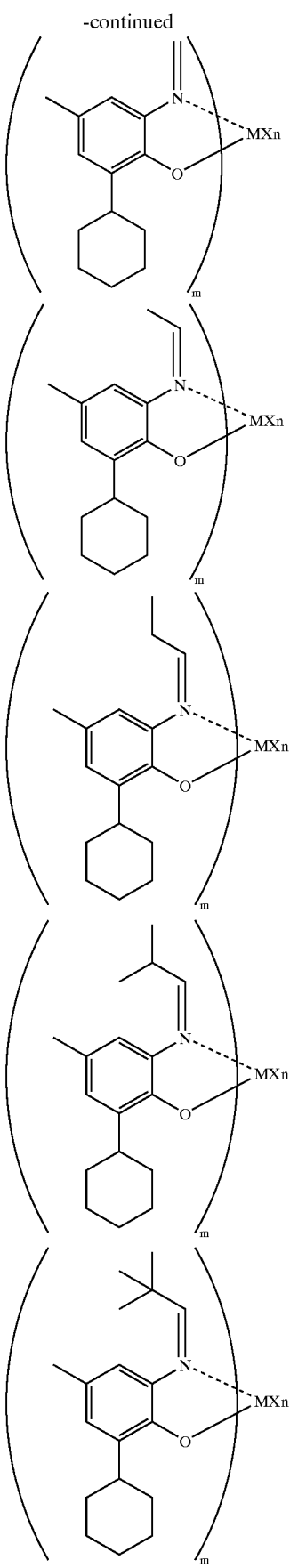

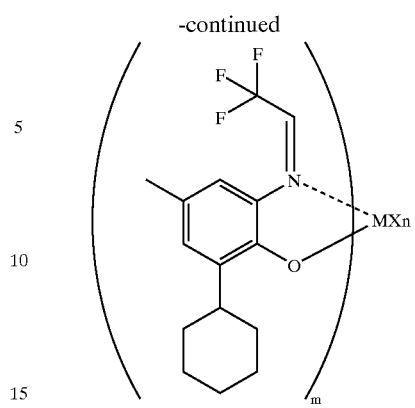

In the above exemplified compounds, Me denotes a methyl group and Ada denotes a 1-adamantyl group.

The transition metal compounds (A) can be used singly or in combination of two or more kinds. The transition metal compounds (A) can be used in combination with transition metal compounds other than the compounds (A), e.g., conventionally known transition metal compounds comprising a ligand containing a hetero atom such as nitrogen, oxygen, sulfur, boron or phosphorus.

Such transition metal compounds (A) can be prepared, for example, by the following process.

A compound (ligand precursor) which is a ligand forming the transition metal compound (A) can be obtained, for example, by introducing a substituent into an amine moiety of a raw material (starting compound) such as o-aminophenol compounds when Y is an oxygen atom, o-aminothiophenol compounds when Y is a sulfur atom, or o-phenylenediamine compounds when Y contains nitrogen. Employable agents to introduce the substituent are aldehydes and ketones.

Specifically, both of the starting compound and the agent are dissolved in a solvent. Usual solvents can be used in this reaction, and examples thereof include alcohols, ethers, nitrile compounds, halogenated hydrocarbon solvents, aromatic hydrocarbon solvents and saturated hydrocarbon solvents. Subsequently, the resulting solution is stirred at any temperature selected from 0° C. to reflux temperature for about 1 to 48 hours, to thereby obtain a corresponding ligand precursor. In the reaction, if an acid or a base is used according to necessity, a product can be obtained with a good yield.

Then, by allowing the obtained ligand precursor to react with a metal compound, a corresponding transition metal compound can be synthesized.

Specifically, the synthesized ligand precursor is dissolved in a solvent, and is brought into contact with a base according to necessity to prepare a salt such as phenoxide, thiophenoxide, and amide. Then, the dissolved precursor is mixed with a metal compound such as a metal halide, a metal amide and an alkyl metal at a low temperature, and the obtaiened mixture is stirred at −78° C. to room temperature or under reflux conditions for 1 to 48 hours.

Usual solvents can be used in this reaction. Of these, preferably used are polar solvents such as ether and tetrahydrofuran and hydrocarbon solvents such as toluene. As the base used in preparing a salt, preferable are metal salts (e.g., a lithium salt such as n-butyllithium, a sodium salt such as hydrogenated sodium and a potassium salt such as hydrogenated potassium) and organic bases such as triethylamine and pyridine. The number of ligands to be contained in the obtained transition metal compound can be controlled by changing the loading proportion of the metal compound and the ligand precursor.

Further, depending on the properties of a ligand precursor and metal compound used in the reaction, a corresponding transition metal compound can be synthesized by allowing the ligand precursor to react directly with a metal compound without preparing a salt such as phenoxide, thiophenoxide and amide.

Still further, the transition metal in the synthesized transition metal compound can be replaced with another transition metal by a conventional method. When any one of $R^1$ to $R^7$ is a hydrogen atom, a substituent other than a hydrogen atom can be introduced at an arbitrary stage of the synthesizing process.

(B-1) Compound Having a Reduction Ability which Reacts with the Transition Metal Compound (A) to Convert an Imine Structure Moiety to a Metallic Amide Structure "Imine structure moiety" used herein means a structure moiety included in a structure of the transition metal compound (A), in which nitrogen and carbon atoms are bound by a double bond.

"Metallic amide structure" used herein means a structure in which nitrogen and carbon atoms are bound by a single bond and further metallic atoms are bound with nitrogen atoms by a coordinate bond or ionic bond.

As the compounds (also referred to as "reducing agent" hereinafter) used herein (B-1) having reduction ability which reacts with the transition metal compound (A) to convert an imine structure moiety to a metallic amide structure, the following compounds are specifically used.

(B-1a) Organoaluminum compound represented by the following formula:

$$R^a{}_m Al(OR^b)_n H_p X_q \quad (B\text{-}1a)$$

wherein $R^a$ is a hydrocarbon group of 2 to 15 carbon atoms, preferably 2 to 4 carbon atoms and $R^b$ is a hydrocarbon group of 1 to 15 carbon atoms, preferably 1 to 4 carbon atoms, and they may be the same or different; X is a halogen atom; and m, n, p and q are numbers satisfying the conditions of $0<m\leq 3$, $0\leq p\leq 3$, $0\leq q\leq 3$ and $m+n+p+q=3$.

(B-1b) Alkyl complex compound of a metal of Group 1 and aluminum, which is represented by the following formula:

$$M^2 Al R^a{}_4 \quad (B\text{-}1b)$$

wherein $M^2$ is Li, Na or K; and $R^a$ is a hydrocarbon group of 2 to 15 carbon atoms, preferably 2 to 4 carbon atoms.

Examples of the organoaluminum compounds (B-1a) include:

an organoaluminum compound represented by the following formula:

$$R^a{}_m Al(OR^b)_{3-m}$$

wherein $R^a$ is a hydrocarbon group of 2 to 15 carbon atoms, preferably 2 to 4 carbon atoms, $R^b$ is a hydrocarbon group of 1 to 15 carbon atoms, preferably 1 to 4 carbon atoms, and $R^a$ and $R^b$ may be the same or different, and m is preferably a number satisfying the condition of $1.5\leq m\leq 3$;

an organoaluminum compound represented by the following formula:

$$R^a{}_m Al X_{3-m}$$

wherein $R^a$ is a hydrocarbon group of 2 to 15 carbon atoms, preferably 2 to 4 carbon atoms, X is a halogen atom, and m is preferably a number satisfying the condition of $0<m<3$;

an organoaluminum compound represented by the following formula:

$$R^a{}_m Al H_{3-m}$$

wherein $R^a$ is a hydrocarbon group of 2 to 15 carbon atoms, preferably 2 to 4 carbon atoms, and m is preferably a number satisfying the condition of $2\leq m<3$;

and an organoaluminum compound represented by the following formula:

$$R^a{}_m Al(OR^b)_n X_q.$$

wherein $R^a$ is a hydrocarbon group of 2 to 15 carbon atoms, preferably 2 to 4 carbon atoms, $R^b$ is a hydrocarbon group of 1 to 15 carbon atoms, preferably 1 to 4 carbon atoms, and $R^a$ and $R^b$ may be the same or different, X is a halogen atom, and m, n and q are numbers satisfying the conditions of $0<m\leq 3$, $0<n\leq 3$, $0\leq q<3$ and $m+n+q=3$.

Particular examples of the organoaluminum compounds (B-1a) include:

tri-n-alkylaluminums, such as triethylaluminum, tri-n-butylaluminum, tripropylaluminum, tripentylaluminum, trihexylaluminum, trioctylaluminum and tridecylaluminum;

branched-chain alkylaluminums, such as triisopropylaluminum, triisobutylaluminum, tri-sec-butylaluminum, tri-tert-butylaluminum, tri-2-methylbutylaluminum, tri-3-methylbutylaluminum, tri-2-methylpentylaluminum, tri-3-methylpentylaluminum, tri-4-methylpentylaluminum, tri-2-methylhexylaluminum, tri-3-methylhexylaluminum and tri-2-ethylhexylaluminum;

tricycloalkylaluminums, such as tricyclohexylaluminum and tricyclooctylaluminum;

dialkylaluminum hydrides, such as diisopropylaluminum hydride and diisobutylaluminum hydride;

trialkenylaluminums, e.g., those represented by the formula $(i\text{-}C_4H_9)_x Al_y (C_5H_{10})_z$ (wherein x, y and z are each a positive number, and $z\geq 2x$), such as triisoprenylaluminum;

alkylaluminum alkoxides, such as isobutylaluminum methoxide, isobutylaluminum ethoxide and isobutylaluminum isopropoxide;

dialkylaluminum alkoxides, such as diethylaluminum ethoxide and dibutylaluminum butoxide;

alkylaluminum sesquialkoxides, such as ethylaluminum sesquiethoxide and butylaluminum sesquibutoxide;

partially alkoxylated alkylaluminums, such as those having an average composition represented by $R^a{}_{2.5}Al(OR^b)_{0.5}$ (wherein $R^a$ and $R^b$ may be the same or different and are hydrocarbon groups of 2 to 15 carbon atoms, preferably 2 to 4 carbon atoms.);

dialkylaluminum aryloxides, such as diethylaluminum phenoxide, diethylaluminum(2,6-di-t-butyl-4-methylphenoxide), ethylaluminumbis(2,6-di-t-butyl-4-methylphenoxide), diisobutylaluminum(2,6-di-t-butyl-4-methylphenoxide) and isobutylaluminumbis(2,6-di-t-butyl-4-methylphenoxide);

dialkylaluminum halides, such as diethylaluminum chloride, dibutylaluminum chloride, diethylaluminum bromide and diisobutylaluminum chloride;

alkylaluminum sesquihalides, such as ethylaluminum sesquichloride, butylaluminum sesquichloride and ethylaluminum sesquibromide, partially halogenated alkylaluminums, such as ethylaluminum dichloride, propylaluminum dichloride and butylaluminum dibromide;

dialkylaluminum hydrides, such as diethylaluminum hydride and dibutylaluminum hydride;

partially hydrogenated alkylaluminums, e.g., alkylaluminum dihydrides, such as ethylaluminum dihydride and propylaluminum dihydride; and partially alkoxylated and halogenated alkylaluminums, such as ethylaluminum ethoxychloride, butylaluminum butoxychloride and ethylaluminum ethoxybromide.

Also employable are compounds analogous to the organoaluminum compound (B-1a). For example, there can be mentioned organoaluminum compounds wherein two or more aluminum compounds are bonded through a nitrogen atom, such as $(C_2H_5)_2AlN(C_2H_5)Al(C_2H_5)_2$.

Examples of the compounds (B-1b) include $LiAl(C_2H_5)_4$ and $LiAl(C_7H_{15})_4$.

Compounds capable of forming the above-mentioned organoaluminum compounds in the polymerization system, e.g., a combination of halogenated aluminum and alkyllithium and a combination of halogenated aluminum and alkylmagnesium, are also employable.

Also, other compounds which can be used as reducing agents (B-1) include hydrides such as $LiAlH_4$, $LiBH_4$, $NaBH_4$, $NaBH_3CN$, $(BH_3)_2$, dibutyl tin hydride, tributyl tin hydride, PhSeH and the like; $H_2$; Raney nickel; metals with zero valence such as samarium, ytterbium, zinc and the like; silane compounds such as diethylsilane, diphenylsilane and the like.

The effects of the reducing agent (B-1) can be confirmed by observing that the Imine structure moiety of the transition metallic compound (A) is converted to the metallic amide structure by a reaction with the transition metal compound (A).

The methods to confirm it include nuclear magnetic resonance spectra under conditions according to the polymerization conditions, and nuclear magnetic resonance spectra and mass spectra of organic compounds extracted with alcohol from the reaction mixture.

Of the reducing agents (B-1), the organoaluminum compounds are preferable.

The reducing agents (B-1) mentioned above can be used singly or in combination of two or more kinds.

(B-2) Compound which Reacts with the Transition Metal Compound (A) to Form Ion Pair The compound (B-2) which reacts with the transition metal compound (A) to form an ion pair (referred to as "ionizing ionic compound" hereinafter) is a compound which reacts with the aforesaid transition metal compound (A) to form an ion pair. Any compound which forms an ion pair by the contact with the transition metal compound (A) is employable.

As examples of such compounds, there can be mentioned Lewis acids, ionic compounds, borane compounds and as carborane compounds described in Japanese Patent Laid-Open Publications No. 501950/1989, No. 502036/1989, No. 179005/1991, No. 179006/1991, No. 207703/1991 and No. 207704/1991, and U.S. Pat. No. 5,321,106. A heteropoly compound and an isopoly compound can also be mentioned.

The Lewis acids are, for example, compounds represented by $BR_3$ (R is a phenyl group which may have a substituent such as fluorine, a methyl group or a trifluoromethyl group, or fluorine). Examples of such compounds include trifluoroboron, triphenylboron, tris(4-fluorophenyl)boron, tris(3,5-difluorophenyl)boron, tris(4-fluorophenyl)boron, tris(pentafluorophenyl)boron, tris(p-tolyl)boron, tris(o-tolyl)boron and tris(3,5-dimethylphenyl)boron.

The ionic compounds are, for example, compounds represented by the following formula (II):

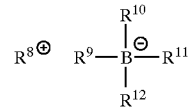

(II)

In the above formula, $R^8$ is $H^+$, carbonium cation, oxonium cation, ammonium cation, phosphonium cation, cycloheptyltrienyl cation, ferrocenium cation having a transition metal, or the like.

$R^9$ to $R^{12}$ may be the same or different, and are each an organic group, preferably an aryl group or a substituted aryl group.

Examples of the carbonium cations include tri-substituted carbonium cations, such as triphenylcarbonium cation, tri(methylphenyl)carbonium cation and tri(dimethylphenyl)carbonium cation.

Examples of the ammonium cations include trialkylammonium cations, such as trimethylammonium cation, triethylammonium cation, tripropylammonium cation, tributylammonium cation and tri(n-butyl)ammonium cation; N,N-dialkylanilinium cations, such as N,N-dimethylanilinium cation, N,N-diethylanilinium cation and N,N-2,4,6-pentamethylanilinium cation; and dialkylammonium cations, such as di(isopropyl)ammonium cation and dicyclohexylammonium cation.

Examples of the phosphonium cations include triarylphosphonium cations, such as triphenylphosphonium cation, tri(methylphenyl)phosphonium cation and tri(dimethylphenyl)phosphonium cation.

$R^8$ is preferably carbonium cation or ammonium cation, particularly preferably triphenylcarbonium cation, N,N-dimethylanilinium cation or N,N-diethylanilinium cation.

As examples of the ionic compounds, there can be mentioned trialkyl-substituted ammonium salts, N,N-dialkylanilinium salts, dialkylammonium salts or triarylphosphonium salts.

Examples of the trialkyl-substituted ammonium salts include triethylammoniumtetra(phenyl)boron, tripropylammoniumtetra(phenyl)boron, tri(n-butyl)ammoniumtetra(phenyl)boron, trimethylammoniumtetra(p-tolyl)boron, trimethylammoniumtetra(o-tolyl)boron, tri(n-butyl)ammoniumtetra(pentafluorophenyl)boron, tripropylammoniumtetra(o,p-dimethylphenyl)boron, tri(n-butyl)ammoniumtetra(m,m-dimethylphenyl)boron, tri(n-butyl)ammoniumtetra(p-trifluoromethylphenyl)boron, tri(n-butyl)ammoniumtetra(3,5-ditrifluorophenyl)boron and tri(n-butyl)ammoniumtetra(o-tolyl)boron.

Examples of the N,N-dialkylanilinium salts include N,N-dimethylaniliniumtetra(phenyl)boron, N,N-diethylaniliniumtetra(phenyl)boron and N,N-2,4,6-pentamethylaniliniumtetra(phenyl)boron.

As examples of the dialkylammonium salts, there can be mentioned di(1-propyl)ammoniumtetra(pentafluorophenyl)boron and dicyclopentahexylammoniumtetra(phenyl)boron.

Further employable as the ionic compounds are triphenylcarbeniumtetrakis(pentafluorophenyl)borate, N,N-dimethylaniliniumtetrakis(pentafluorophenyl)borate, ferroceniumtetra(pentafluorophenyl)borate, triphenylcarbeniumpentaphenylcyclopentadienyl complex, N,N- diethylaniliniumpentaphenylcyclopentadienyl complex and a boron compound represented by the formula (III) or (IV):

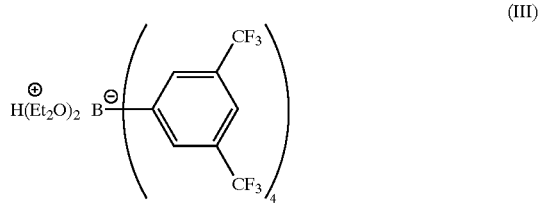

(III)

wherein Et is an ethyl group,

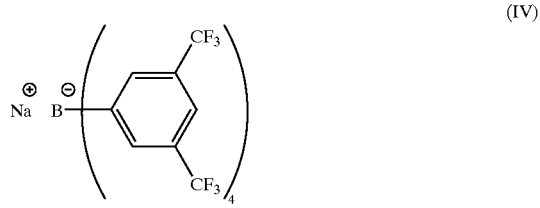

(IV)

Examples of the borane compounds include:
decaborane(14);
anion salts, such as bis[tri(n-butyl)ammonium] nonaborate, bis[tri(n-butyl)ammonium]decaborate, bis[tri(n-butyl)ammonium]undecaborate, bis[tri(n-butyl)ammonium]dodecaborate, bis[tri(n-butyl)ammonium]decachloroborate and bis[tri(n-butyl)ammonium]dodecachloroborate; and
metallic borane anion salts, such as tri(n-butyl)ammoniumbis(dodecahydridododecaborate)cobaltate (III) and bis[tri(n-butyl)ammonium]bis-(dodecahydridododecaborate)nickelate(III).

Examples of the carborane compounds include:
anion salts, such as 4-carbanonaborane(14), 1,3-dicarbanonaborane(13), 6,9-dicarbadecaborane(14), dodecahydrido-1-phenyl-1,3-dicarbanonaborane, dodecahydrido-1-methyl-1,3-dicarbanonaborane, undecahydrido-1,3-dimethyl-1,3-dicarbanonaborane, 7,8-dicarbaundecaborane(13), 2,7-dicarbaundecaborane(13), undecahydrido-7,8-dimethyl-7,8-dicarbaundecaborane, dodecahydrido-11-methyl-2,7-dicarbaundecaborane, tri(n-butyl)ammonium-1-carbadecaborate, tri(n-butyl)ammonium-1-carbaundecaborate, tri(n-butyl)ammonium-1-carbadodecaborate, tri(n-butyl)ammonium-1-trimethylsilyl-1-carbadecaborate, tri(n-butyl)ammoniumbromo-1-carbadodecaborate, tri(n-butyl)ammonium-6-carbadecaborate(14), tri(n-butyl)ammonium-6-carbadecaborate(12), tri(n-butyl)ammonium-7-carbaundecaborate(13), tri(n-butyl)ammonium-7,8-dicarbaundecaborate(12) tri(n-butyl)ammonium-2,9-dicarbaundecaborate(12), tri(n-butyl)ammoniumdodecahydrido-8-methyl-7,9-dicarbaundecaborate, tri(n-butyl)ammoniumdodecahydrido-8-ethyl-7,9-dicarbaundecaborate, tri(n-butyl)ammoniumundecahydrido-8-butyl-7,9-dicarbaundecaborate, tri(n-butyl)ammoniumundecahydrido-8-allyl-7,9-dicarbaundecaborate, tri(n-butyl)ammoniumundecahydrido-9-trimethylsilyl-7,8-dicarbaundecaborate and tri(n-butyl)ammoniumundecahydrido-4,6-dibromo-7-carbaundecaborate; and
metallic carborane anion salts, such as tri(n-butyl)ammoniumbis(nonahydrido-1,3-dicarbanonaborate)cobaltate (III), tri(n-butyl)ammoniumbis(undecahydrido-7,8-dicarbaundecaborate)ferrate(III), tri(n-butyl)ammoniumbis(undecahydrido-7,8-dicarbaundecaborate)cobaltate(III), tri(n-butyl)ammoniumbis(undecahydrido-7,8-dicarbaundecaborate)nickelate(III), tri(n-butyl)ammoniumbis(undecahydrido-7,8-dicarbaundecaborate)cuprate(III), tri(n-butyl)ammoniumbis(undecahydrido-7,8-dicarbaundecaborate)aurate(III), tri(n-butyl)ammoniumbis(nonahydrido-7,8-dimethyl-7,8-dicarbaundecaborate)ferrate(III), tri(n-butyl)ammoniumbis(nonahydrido-7,8-dimethyl-7,8-dicarbaundecaborate)chromate(III), tri(n-butyl)ammoniumbis(tribromooctahydrido-7,8-dicarbaundecaborate)cobaltate(III), tris[tri(n-butyl)ammonium]bis(undecahydrido-7-carbaundecaborate)chromate(III), bis[tri(n-butyl)ammonium]bis(undecahydrido-7-carbaundecaborate)manganate(IV), bis[tri(n-butyl)ammonium]bis(undecahydrido-7-carbaundecaborate)cobaltate(III) and bis[tri(n-butyl)ammonium]bis(undecahydrido-7-carbaundecaborate)nickelate(IV).

The heteropoly compound comprises an atom selected from silicon, phosphorus, titanium, germanium, arsenic and tin and one or more atoms selected from vanadium, niobium, molybdenum and tungsten. Examples of such compounds include phosphovanadic acid, germanovanadic acid, arsenovanadic acid, phosphoniobic acid, germanoniobic acid, siliconomolybdic acid, phosphomolybdic acid, titanomolybdic acid, germanomolybdic acid, arsenomolybdic acid, stannomolybdic acid, phosphotungstic acid, germanotungstic acid, stannotungstic acid, phosphomolybdovanadic acid, phosphotungstovanadic acid, germanotungstovanadic acid, phosphomolybdotungstovanadic acid, germanomolybdotungstovanadic acid, phosphomolybdotungstic acid, phosphomolybdoniobic acid, salts of these acids with metals of, for example Group 1 or 2 of the periodic table such as lithium, sodium, potassium, rubidium, cesium, beryllium, magnesium, calcium, strontium and barium, organic salts of the above acids such as triphenylethyl salt, and isopoly compounds.

These heteropoly compounds and isopoly compounds may be used singly or in combination of two or more kinds.

The ionizing ionic compounds (B-2) may be used singly or in combination of two or more kinds.

Further, in the olefin polymerization catalyst of the invention, a carrier (C) described below can be used according to necessity, in addition to the above-mentioned transition metal compound (A), the reducing agent (B-1) and the ionizing ionic compound (B-2).

(C) Carrier

The carrier (C) optionally used in the invention is an inorganic or organic compound in the form of granular or fine particle solid.

As the inorganic compounds, porous oxides, inorganic halides, clay, clay minerals or ion-exchangeable lamellar compounds are preferable.

Examples of the porous oxides include inorganic oxides such al $SiO_2$, $Al_2O_3$, MgO, ZrO, $TiO_2$, $B_2O_3$, CaO, ZnO, BaO and $ThO_2$, and composites or mixtures containing these oxides, such as natural or synthetic zeolite, $SiO_2$—MgO, $SiO_2$—$Al_2O_3$, $SiO_2$—$TiO_2$, $SiO_2$—$V_2O_5$, $SiO_2$—$CrO_3$ and $SiO_2$—$TiO_2$—MgO. Of these, preferable are composites or mixtures containing $SiO_2$ and/or $Al_2O_3$ as the main component(s).

The inorganic oxides may contain small amounts of carbonates, sulfates, nitrates and oxide components, such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$ and $Li_2O$.

The carrier preferably used in the invention has a particle diameter of 10 to 300 μm, preferably 20 to 200 μm, a specific surface area of 50 to 1,000 m$^2$/g, preferably 100 to 700 m$^2$/g, and a pore volume of 0.3 to 3.0 cm$^3$/g, though the porous oxides differ in their properties depending on the type and the preparation process thereof. According to necessity, the carrier may be calcined at 100 to 1,000° C., preferably 150 to 700° C., prior to use.

Examples of the inorganic halides used in the invention include $MgCl_2$, $MgBr_2$, $MnCl_2$ and $MnBr_2$. The inorganic halides may be used as it is, or may be used after pulverized by, for example, a ball mill or an oscillating mill. The inorganic halides may also be used in the form of fine particles obtained by dissolving the inorganic halide in a solvent such as alcohol and then precipitating using a precipitant.

The clay employable as a carrier is generally composed mainly of clay minerals. The ion-exchangeable lamellar compounds employable as a carrier are compounds having a crystalline structure wherein planes formed by ionic bonding or the like are laminated in parallel to each other with a weak bond strength, and the ions contained therein are exchangeable. Most of clay minerals are ion-exchangeable lamellar compounds. AS the clay, clay minerals and ion-exchangeable lamellar compounds, not only natural ones but synthetic ones can also be used.

Examples of such clay, clay minerals and ion-exchangeable lamellar compounds include ion crystalline compounds having a lamellar crystal structure such as hexagonal closest packing type, antimony type, $CdCl_2$ type and $CdI_2$ type.

Specific examples of the clay and clay minerals include kaolin, bentonite, kibushi clay, gairome clay, allophane, hisingerite, pyrophyllite, mica, montmorillonite, vermiculite, chlorite, palygorskite, kaolinite, nacrite, dickite and halloysite. Specific examples of the ion-exchangeable lamellar compounds include crystalline acid salts of polyvalent metals, such as α-$Zr(HAsO_4)_2 \cdot H_2O$, α-$Zr(HPO_4)_2$, α-$Zr(KPO_4)_2 \cdot 3H_2O$, α-$Ti(HPO_4)_2 \cdot H_2O$, α-$Ti(HAsO_4)_2 \cdot H_2O$, α-$Sn(HPO_4)_2 \cdot H_2O$, γ-$Zr(HPO_4)_2$, γ-$Ti(HPO_4)_2$ and γ-$Ti(NH_4PO_4)_2 \cdot H_2O$.

The clay, clay minerals and ion-exchangeable lamellar compounds are preferably those having a pore volume, as measured on pores having a radius of not less than 20 Å by a mercury penetration method, of not less than 0.1 ml/g, particularly preferably 0.3 to 5 ml/g. The pore volume is measured on the pores having a radius of 20 to 3×10$^4$ Å by a mercury penetration method using a mercury porosimeter. When a compound having a pore volume, as measured on pores having a radius of not less than 20 Å, of less than 0.1 ml/g is used as the carrier, there is a tendency that high polymerization activity is hard to obtain.

The clay and clay minerals are preferably subjected to chemical treatments. Any of chemical treatments, for example, a surface treatment to remove impurities attached on the surface and a treatment to influence a crystal structure of the clay, can be adopted. Examples of such chemical treatments include acid treatment, alkali treatment, salt treatment and organic substance treatment. The acid treatment can contribute to not only removing impurities from the surface but also eluting ions such as Al, Fe and Mg present in the crystal structure to increase the surface area. The alkali treatment can destroy crystal structure of clay to bring about change in the structure of the clay. The salt treatment and organic substance treatment can produce, for example, ionic composites, molecular composites, or organic derivatives to change the surface area or the distance between layers.

The ion-exchangeable lamellar compound may be a lamellar compound in which the exchangeable ions between layers are exchanged with other large and bulky ions utilizing ion exchangability to enlarge the distance between the layers. The bulky ion plays a pillar-like roll to support the layer structure and is generally called a "pillar". Introduction of other substances between layers of a lamellar compound is called "intercalation". Examples of the guest molecules to be intercalated include ionic inorganic compounds, such as $TiCl_4$ and $ZrCl_4$; metallic alkoxides, such as $Ti(OR)_4$, $Zr(OR)_4$, $PO(OR)_3$ and $B(OR)_3$ (R is a hydrocarbon group or the like); and metallic hydroxide ions, such as $[Al_{13}O_4(OH)_{24}]^{7+}$, $[Zr_4(OH)_{14}]^{2+}$ and $[Fe_3O(OCOCH_3)_6]^+$.

The compounds mentioned above may be used singly or in combination of two or more kinds.

The intercalation of these compounds may be carried out in the presence of polymers obtained by hydrolysis of metallic alkoxides such as $Si(OR)_4$, $Al(OR)_3$ and $Ge(OR)_4$ (R is a hydrocarbon group or the like) or in the presence of colloidal inorganic compounds such as $SiO_2$. Examples of the pillars include oxides produced by intercalation of the above-mentioned metallic hydroxide ions between layers, followed by dehydration under heating.

The clay, clay minerals and ion-exchangeable lamellar compounds mentioned above may be used as they are, or may be used after they are subjected to a treatment of ball milling, sieving or the like. Moreover, they may be used after they are subjected to water adsorption or dehydration under heating. The clay, clay minerals and ion-exchangeable lamellar compounds may be used singly or in combination of two or more kinds.

Of the above-mentioned carriers, preferable are the clay and clay minerals, and particularly preferable are montmorillonite, vermiculite, hectorite, tenorite and synthetic mica.

The organic compound is, for example, a granular or fine particulate solid compound having a particle diameter of 10 to 300 μm. Examples of such compounds include (co) polymers produced using an α-olefin of 2 to 14 carbon atoms such as ethylene, propylene, 1-butene or 4-methyl-1-pentene as a main ingredient, (co)polymers produced using, vinylcyclohexane or styrene as a main ingredient, and modified products thereof.

The olefin polymerization catalyst used in the invention may further comprise the below-described specific organic compound component (D) according to necessity, in addition to the transition metal compound (A), the reducing agent (B-1) and the ionizing ionic compound (B-2), and the optionally used carrier (C).

(D) Organic Compound Component

In the present invention, the organic compound component (D) is used according to necessity in order to improve polymerizability and properties of the produced polymer. Examples of the organic compounds include alcohols, phenolic compounds, carboxylic acids, phosphorus compounds and sulfonates.

As the alcohols and phenolic compounds, those represented by $R^{13}$—OH ($R^{13}$ is a hydrocarbon group of 1 to 50 carbon atoms or a halogenated hydrocarbon group of 1 to 50 carbon atoms) are generally used. Preferable alcohols are those wherein $R^{13}$ is a halogenated hydrocarbon group. Preferable phenolic compounds are those wherein the α,α'- positions of the hydroxyl group are substituted with hydrocarbon groups of 1 to 20 carbon atoms.

As the carboxylic acids, those represented by $R^{14}$—COOH are generally used. $R^{14}$ is a hydrocarbon group of 1 to 50 carbon atoms or a halogenated hydrocarbon group of 1 to 50 carbon atoms, preferably a halogenated hydrocarbon group of 1 to 50 carbon atoms.

As the phosphorus compounds, phosphoric acids having P—O—H bond, phosphates having P—OR bond or P—O bond and phosphine oxide compounds are preferably used.

The sulfonates are those represented by the following formula (V):

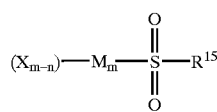

(V)

In the above formula, M is an element of Groups 1 to 14 of the periodic table.

$R^{15}$ is hydrogen, a hydrocarbon group of 1 to 20 carbon atoms or a halogenated hydrocarbon group of 1 to 20 carbon atoms.

X is a hydrogen atom, a halogen atom, a hydrocarbon group of 1 to 20 carbon atoms or a halogenated hydrocarbon group of 1 to 20 carbon atoms.

m is an integer of 1 to 7, and n is $1 \leq n \leq 7$.

FIG. 1 shows a process for preparing an olefin polymerization catalyst of the invention.

Next, the process for polymerizing an olefin is described.

Process for Polymerizing an Olefin

The process for polymerizing an olefin according to the invention comprises (co)polymerizing an olefin in the presence of the olefin polymerization catalyst described above.

A usage and an order to add the components are of an arbitrary choice. The following are examples.

(1) The component (A), and the reducing agent (B-1) and the ionizing ionic compound (B-2) (hereinafter referred to as simply "component (B)") are fed to the polymerization reactor in an arbitrary order.

(2) A catalyst obtained by previously contacting the components (A) and (B) is fed to the polymerization reactor.

(3) A catalyst component obtained by previously contacting the components (A) and (B), and the component (B) are fed to the polymerization reactor in an arbitrary order. In this case, the components (B) may be the same or different.

(4) A catalyst component wherein the component (A) is supported on the carrier (C), and the component (B) are fed to the polymerization reactor in an arbitrary order.

(5) A catalyst wherein the components (A) and (B) are supported on the carrier (C) is fed to the polymerization reactor.

(6) A catalyst component wherein the components (A) and (B) are supported on the carrier (C), and the component (B) are fed to the polymerization reactor in an arbitrary order. In this case, the components (B) may be the same or different.

(7) A catalyst component wherein the component (B) is supported on the carrier (C), and the component (A) are fed to the polymerization reactor in an arbitrary order.

(8) A catalyst component wherein the component (B) is supported on the carrier (C), and the components (A) and (B) are fed to the polymerization reactor in an arbitrary order. In this case, the components (B) may be the same or different.

(9) A component wherein the component (A) is supported on the carrier (C) and a component wherein the component (B) is supported on the carrier (C) are fed to the polymerization reactor in an arbitrary order.

(10) A component wherein the component (A) is supported on the carrier (C), a component wherein the component (B) is supported on the carrier (C) and the component (B) are fed to the polymerization reactor in an arbitrary order. In this case, the components (B) may be the same or different.

(11) The components (A) and (B), and the organic compound component (D) are fed to the polymerization reactor in an arbitrary order.

(12) A component obtained by previously contacting the components (B) and (D), and the component (A) are fed to the polymerization reactor in an arbitrary order.

(13) A component wherein the components (B) and (D) are supported on the carrier (C), and the component (A) are fed to the polymerization reactor in an arbitrary order.

(14) A catalyst component obtained by previously contacting the components (A) and (D), and the component (D) are fed to the polymerization reactor in an arbitrary order.

(15) A catalyst component obtained by previously contacting the components (A) and (B), the component (B) and the component (D) are fed to the polymerization reactor in an arbitrary order.

(16) A catalyst component obtained by previously contacting the components (A) and (B), and a component obtained by previously contacting the components (B) and (D) are fed to the polymerization reactor in an arbitrary order.

(17) A component wherein the component (A) is supported on the carrier (C), the components (B) and (D) are fed to the polymerization reactor in an arbitrary order.

(18) A component wherein the component (A) is supported on the carrier (C), and a component obtained by previously contacting the components (B) and (D) are fed to the polymerization reactor in an arbitrary order.

(19) A catalyst component obtained by previously contacting the components (A), (B) and (D) is fed to the polymerization reactor.

(20) A catalyst component obtained by previously contacting the component (A), (B) and (D), and the component (B) are fed to the polymerization reactor in an arbitrary order. In this case, the components (B) may be the same or different.

(21) A catalyst wherein the components (A), (B) and (D) are supported on the carrier (C) is fed to the polymerization reactor.

(22) A catalyst component wherein the components (A), (B) and (D) are supported on the carrier (C), and the component (B) are fed to the polymerization reactor in an gin arbitrary order. In this case, the components (B) may be the same or different.

The solid catalyst component where the components (A) and (B) are supported on the carrier (C) may be prepolymerized with an olefin.

The process for producing an olefin of the present invention produces an olefin polymer by polymerizing an olefin or copolymerizing olefins in the presence of the above olefin polymerization catalyst.

In the present invention, the polymerization can be carried out by both liquid phase polymerizations, such as solution polymerization or suspension polymerization, and gas phase polymerizations.

Examples of inert hydrocarbon media for use in the liquid phase polymerization include aliphatic hydrocarbons, such as propane, butane, pentane, hexane, heptane, octane, decane, dodecane and kerosine; alicyclic hydrocarbons, such as cyclopentane, cyclohexane and methylcyclopentane; aromatic hydrocarbons, such as benzene, toluene and xylene; halogenated hydrocarbons, such as ethylene chloride, chlorobenzene and dichloromethane; and mixtures of these hydrocarbons. The olefin itself can be used as the solvent.

In the (co)polymerization of olefin using the olefin polymerization catalyst, the component (A) may be used in an amount of usually $10^{-12}$ to $10^{-2}$ mol, preferably $10^{-10}$ to $10^{-3}$ mol, based on 1 liter of the reaction volume. In the ok present invention, even if the component (A) is used in a relatively low concentration, an olefin can be polymerized with a high polymerization activity.

The component (B-1) may used in such an amount that the molar ratio of the component (B-1) to the transition metal atom (M) in the component (A) ((B-1)/(M)) becomes usually 0.01 to 100,000, preferably 0.05 to 50,000.

The component (B-2) may be used in such an amount that the molar ratio of the component (B-2) to the transition metal atom (M) in the component (A) ((B-2)/(M)) becomes usually 1 to 10, preferably 1 to 5.

The component (D) may be used in such an amount that the molar ratio of the component (D) to the total of component (B)((D)/(B)) becomes usually 0.01 to 10, preferably 0.1 to 5.

The polymerization temperature may be in the range of usually 50 to 200° C., preferably 50 to 170° C., more preferably 75 to 170° C.

When olefin polymerization is carried out in the presence of the olefin polymerization catalyst and within the temperature ranges as described above, an olefin can be polymerized with a polypolymerization activity of more than 10 times as compared with, for example, that of a polymerization at around 20° C.

When the polymerization temperature is 50° C. or higher, it is easy to remove reaction heat using ordinary industrial water. That is, it is possible to control the polymerization temperature using a simple heat-removing device. Even if heat-removing device having the same size is used, productivity can be improved by inventive process. Further, because of a higher temperature in the polymerization, a solution viscosity does not become so high and also a stirring power can be lowered even at higher polymer concentration, leading to improvement of productivity.

The polymerization pressure is in the range of usually atmospheric pressure to 100 kg/cm², preferably atmospheric pressure to 50 kg/cm². The polymerization reaction can be carried out by any of batchwise, semi-continuous and continuous processes. The polymerization can also be conducted in two or more stages under different reaction conditions.

When the olefin pressure is in the range of atmospheric pressure to 50 kg/cm² and the polymerization temperature is in the range of 75 to 170° C., the yield of an olefin polymer per 1 mol of a transition metal atom contained in the transition metal compound (A) and 1 hour of polymerization time can be made 1000 kg or more, preferably 5000 kg or more.

The molecular weight of the produced olefin polymer can be controlled by allowing hydrogen to exist into the polymerization system or changing the polymerization temperature.

Further, the molecular weight can be controlled by using the different components (B).

Examples of olefins to be polymerized by the process for producing an olefin include:

α-olefins of 2 to 20 carbon atoms, such as ethylene, propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene;

cycloolefins of 3 to 20 carbon atoms, such as cyclopentene, cycloheptene, norbornene, 5-methyl-2-norbornene, tetracyclododecene and 2-methyl-1,4,5,8-dimethano-1,2,3,4,4a,5,8,8a-octahydronaphthalene; and vinylcyclohexane, dienes and polyenes.

The dienes and the polyenes are cyclic or chain compounds having 4 to 30 carbon atoms, preferably 4 to 20 carbon atoms, and having two or more double bonds. Examples of such compounds include butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidene norbornene, vinyl norbornene and dicyclopentadiene;

7-methyl-1,6-octadiene, 4-ethylidene-8-methyl-1,7-nonadiene and 5,9-dimethyl-1,4,8-decatriene;

aromatic vinyl compounds including mono- or polyalkylstyrenes, such as styrene, o-methylstyrene, m-methylstyrene, p-methylstyrene, o,p-dimethylstyrene, o-ethylstyrene, m-ethylstyrene and p-ethylstyrene; and 3-phenylpropylene, 4-phenylpropylene and α-methylstyrene.

The process for polymerizing an olefin of the invention can produce an olefin polymer with a high polymerization activity, or a polymer having a narrow molecular weight distribution. When two or more kinds of olefins are copolymerized, an olefin copolymer having a narrow composition distribution can be obtained.

The process for polymerizing an olefin of the invention can also be used for copolymerization of an α-olefin and a conjugated diene.

Examples of the α-olefins employable herein include the same straight-chain or branched α-olefins of 2 to 30 carbon atoms, preferably 2 to 20 carbon atoms, as previously described. Of these, preferable are ethylene, propylene, 1-butene, 1-pentene, 1-hexene, 4-methyl-1-pentene and 1-octene. Particularly preferable are ethylene and propylene. These α-olefins can be used singly or in combination or two or more kinds.

Examples of the conjugated dienes include aliphatic conjugated dienes of 4 to 30 carbon atoms, preferably 4 to 20 carbon atoms, such as 1,3-butadiene, isoprene, chloroprene, 1,3-cyclohexadiene, 1,3-pentadiene, 4-methyl-1,3-pentadiene, 1,3-hexadiene and 1,3-octadiene. These conjugated dienes can be used singly or in combination of two or more kinds.

In the invention, an α-olefin can also be copolymerized with the conjugated diene or polyene.

Examples of the conjugated dienes and polyenes include 1,4-pentadiene, 1,5-hexadiene, 1,4-hexadiene, 1,4-octadiene, 1,5-octadiene, 1,6-octadiene, 1,7-octadiene, ethylidene norbornene, vinyl norbornene, dicyclopentadiene, 7-methyl-1,6-octadiene, 4-ethylidene-8-methyl-1,7-nonadiene and 5,9-dimethyl-1,4,8-decatriene.

Effect of the Invention

According to the process for polymerizing an olefin of the present invention, an olefin polymer can be produced with a high polymerization activity.

EXAMPLE

The present invention is further described with reference to the following examples, but it should be construed that the invention is in no way limited to those examples.

The structures of the compounds obtained in the synthetic examples were determined by 270 MHz $^1$H-NMR (Japan Electron Optics Laboratory GSH-270 Model), FD-mass spectrometry (Japan Electron Optics Laboratory SX-102A Model), metal content analysis (analysis by ICP method after dry ashing and dissolution in dilute nitric acid, device: SHIMADZU ICPS-8000 Model), and elemental analysis for carbon, hydrogen and nitrogen (Helaus CHNO Model). The intrinsic viscosity ($\eta$) was measured in decalin at 135° C.

Hereinafter, synthetic examples of the transition metal compound according to the present invention are described.

Synthetic Example 1

Synthesis of Ligand Precursor (1)

To a 200-ml reactor thoroughly purged with nitrogen, 5.0 g of 2,4-di-t-butylphenol and 50 ml of acetic acid were added. To the mixture, 3.0 ml of concentrated nitric acid was rapidly added dropwise while ice-cooling. After the dropwise addition was completed, the resultant mixture was stirred at the same temperature for 1 minute and poured into 200 ml of water. The organic phase extracted with diethyl ether was washed with water and concentrated. The concentrate was purified by a column chromatography to obtain 5.1 g of yellow crystals (yield: 84%).

$^1$H-NMR (CDCl$_3$,δ): 11.41(s,1H), 7.94(d,1H,2 Hz), 7.63 (d,1H,2 Hz), 1.43(s,9H), 1.29(s,9H)

Then, the total amount of the obtained compound, 50 mg of 5% palladium carbon and 100 ml of ethanol were added to a 200-ml reactor, and the mixture was stirred for 48 hours under hydrogen of 1 atmospheric pressure. The reaction solution was filtered through Celite, and then the solvent was distilled off to obtain 4.1 g of white crystals (yield: 89%).

$^1$H-NMR(CDCl$_3$,δ): 6.92(d,1H,2 Hz), 6.82(d,1H,2 Hz), 5.70(s,1H), 3.19(br1H), 1.41(s,9H), 1.28(s,9H)

Subsequently, 2.83 g of the obtained compound (the white crystals) and 50 ml of ethanol were added to a 100-ml reactor thoroughly purged with nitrogen, and 1.63 g of benzaldehyde and 1.0 ml of acetic acid were further added to the reactor. The mixture was stirred at room temperature for 24 hours. The reaction solution was concentrated, and then the concentrate was purified by a column chromatography to obtain a compound (ligand precursor (1)) corresponding to the following formula as 3.2 g of yellow crystals (yield; 80%).

$^1$H-NMR(CDCl$_3$,δ): 8.70(s,1H), 7.96–7.92(m,2H), 7.73 (s,1H), 7.48–7.43(m,3H), 7.25(d,1H,2 Hz), 7.17(d,1H,2 Hz), 1.46(s,9H), 1.35(s,9H)

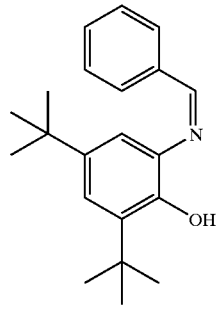

(1)

Synthetic Example 2

Synthesis of a Ligand Precursor (2)

According to the method in Synthetic Example 1, using 2,5-dimethylphenylcarboxyaldehyde in place of benzaldehyde, a compound (ligand precursor (2)) corresponding to the following formula was yield as 2.1 g of yellow crystal (yield; 46%).

$^1$H-NMR(CDCl$_3$,δ) 8.95(s,1H), 7.88(s,1H), 7.70(m,1H), 7.23(bs,1H), 7.18–7.08(m,3H), 2.60(s,3H), 2.35(s,3H), 1.55 (s,9H), 1.34(s,9H)

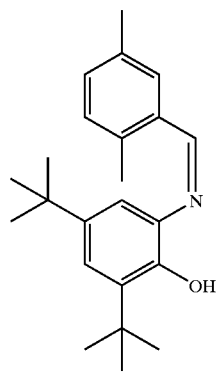

(2)

Synthetic Example 3

Synthesis of a Ligand Precursor (3)

According to the method in Synthetic Example 1, using 2,3,4,5,6-pentafluorophenylcarboxyaldehyde in place of benzaldehyde, a compound (ligand precursor (3)) corresponding to the following formula was yield as 1.1 g of yellow crystal (yield; 31%).

$^1$H-NMR(CDCl$_3$, δ) 8.82(s,1H), 7.75(s,1H), 7.35(d,1H,2 Hz), 7.22(s,1H,2 Hz), 1.43(s, 9H), 1.34 (s,9H)

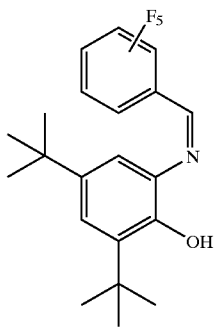

(3)

Synthetic Example 4

Synthesis of a Ligand Precursor (4)

To a 300 ml reactor thoroughly purged with nitrogen, 10.0 g of 2-(1-adamantyl)-4-methyl phenol and 200 ml of acetic acid were added, and 4.0 g of sodium nitrite was added in five portions over 12 hours at room temperature with stirring. The reaction solution was stirred at the same temperature for additional 12 hours and poured into 200 ml of water. The organic phase extracted with diethylether was washed with water, concentrated, and separated and purified by a column chromatography to obtain 2.62 g of yellow crystal (yield; 22%).

$^1$H-NMR(CDCl$_3$, δ): 11.42(s,1H), 7.78(m,1H,), 7.25(m, 1H), 2.30(s,3H), 2.15–2.10(m,9H), 1.82–1.80(m,6H)

Subsequently, the total amount of the obtained compound, 50 mg of 5% palladium carbon, and 100 ml of ethanol were added in a 200-ml reactor, and stirred under hydrogen at one atmosphere for 48 hours. The reaction solution was filtrated through Celite, and then the solvent was distilled off, and 50 ml of ethanol was added. The resultant mixture was transferred into a 100-ml reactor thoroughly purged with nitrogen, further 4.50 g of benzaldehyde and 0.5 ml of acetic acid were added thereto. The mixture was stirred at room temperature for 24 hours. The reaction solution was concentrated, and then separated and purified by a column chromatography to obtain a compound (ligand precursor (4)) corresponding to the following formula as 1.66 g of yellow crystals (yield; 53%).

$^1$H-NMR(CDCl$_3$, δ): 8.83(s,1H), 7.92–7.85(m,2H), 7.81 (m,1H), 7.50–7.39(m,3H), 7.02(m,1H), 6.92(m,1H), 2.32(s, 3H), 2.22–2.15(m,6H), 2.11–2.08(m,3H), 1.82–1.80(m,6H)

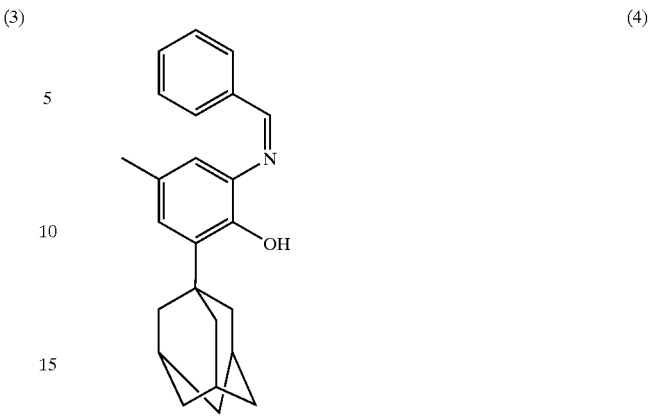

(4)

Synthetic Example 5

Synthesis of Complex Compound (C1)

The following reaction was carried out in an argon atmosphere.

618 mg of the ligand precursor (1) was dissolved in 10 ml of toluene, and the resultant solution was dropwise added to 10 ml of a toluene solution of titanium chloride (0.1 mol/l) at room temperature with stirring. After the stirring was carried out at the same temperature for 24 hours, the reaction mixture was filtered through a glass filter. To the resultant filtrate, 10 ml of n-hexane was added, and the mixture was allowed to stand at −40° C. for 5 hours to obtain a solid. The solid was filtered to obtain a compound (complex compound (C1)) corresponding to the following formula (C1) as 241 mg of reddish brown crystals (yield: 33%)

FD-MS(m/z): 734(intensity 100%, M$^+$), 307(intensity 12%, ligand fragment)

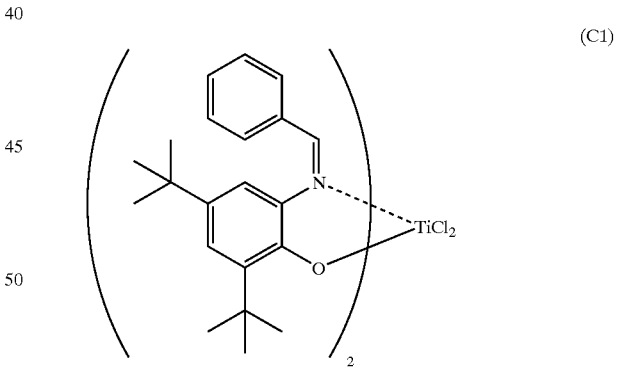

(C1)

Synthetic Example 6

Synthesis of a Complex Compound (C2)

According to the same procedures as in Synthetic Example 5, using the ligand precursor (2) as a raw material, a compound (complex compound (C2)) corresponding to the following formula was yield as 748 mg of reddish crystals (yield; 68%).

FD-MS (m/z): 790(Intensity 100% M$^+$), 336(Intensity 4%, Ligand fragment)

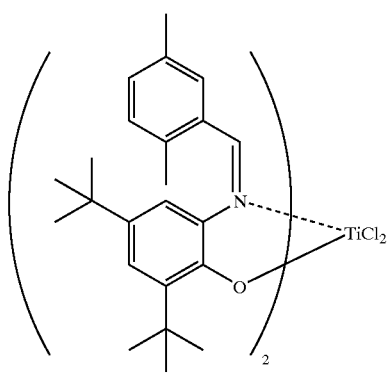

(C2)

Synthetic Example 7

Synthesis of a Complex Compound (C3)

According to the same procedures as in Synthetic Example 5, using the ligand precursor (3) as a raw material, a compound (complex compound (C3)) corresponding to the following formula was yield as 1.09 g of reddish crystals (yield; 82%).

FD-MS(m/z): 914(Intensity 100% M$^+$), 399(Intensity 46%, Ligand fragment)

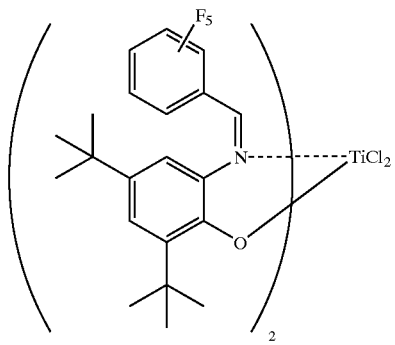

(C3)

Synthetic Example 8

Synthesis of a Complex Compound (C4)

According to the same procedures as in Synthetic Example 5, using the ligand precursor (4) as a raw material, a compound (complex compound (C4)) corresponding to the following formula was yield as 412 mg of reddish crystals (yield; 62%).

FD-MS (m/z): 806(Intensity 62% M$^+$), 343(Intensity 100%, Ligand fragment)

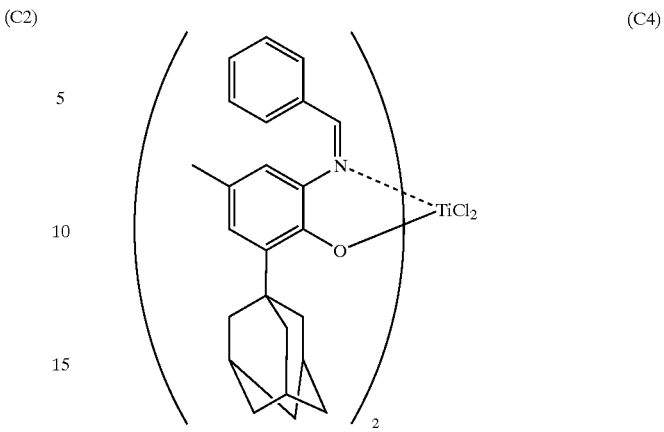

(C4)

Next, the examples in which olefins were polymerized using the complex compounds obtained in the above synthetic examples are described. In the following examples, TrB and TIBA are used for the abbreviations of triphenylcarbenium tetraxis(pentafluorophenyl)borate and triisobutylaluminium, respectively.

Comparative Example 1

To a 500-ml glass autoclave thoroughly purged with nitrogen, 250 ml of toluene was introduced, and the liquid phase and the gas phase were saturated with ethylene. Thereafter, 0.25 mmol of triisobutylalminum (TIBA), and then 0.005 mmol of the complex compound (C1) obtained in Synthetic Example 5 and 0.006 mmol of triphenylcarbenium tetrakis(pentafluorophenyl)borate (TrB) were added to initiate polymerization.

The reaction was conducted at 25° C. for 30 minutes in an ethylene gas atmosphere at atmospheric pressure. After the polymerization was completed, the reaction product was introduced into a large amount of methanol to precipitate a total amount of polymer. Then, hydrochloric acid was added, and the mixture was filtered through a glass filter. The resultant polymer was vacuum dried at 80° C. for 10 hours to obtain 171 mg of polyethylene (PE). The polymerization activity was 68 g-PE/mmol-Ti·hr.

Comparative Example 2

Polymerization of ethylene was carried out under the same conditions as those in Comparative Example 1, using 0.005 mmol of the complex compound (C5) of the following structure synthesized according to the method described in Japanese Patent Laid-Open No. 199592/1999 in place of the complex compound (C1). Carrying out the same post-treatment as in Comparative Example 1, 250 mg of polyethylene was obtained. The polymerization activity was 100 g-PE/mmol-Ti·h, and the intrinsic viscosity (η) of the resultant polyethylene was 8.3 dl/g.

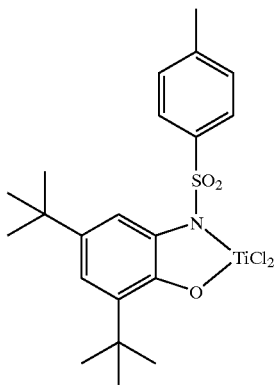

(C5)

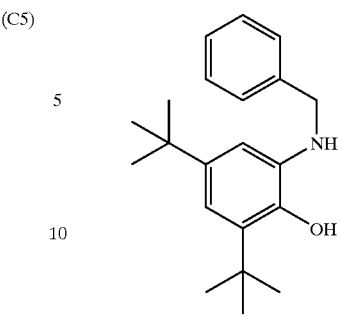

Example 1

Polymerization was carried out under the same conditions as those in Comparative Example 1 except only for alteration of the reaction temperature to 50° C. Carrying out the same post-treatment as in Comparative Example 1, 3513 mg of polyethylene was obtained. The polymerization activity was 1405 g-PE/mmol-Ti·h, and the intrinsic viscosity (η) of the resultant polyethylene was 10.0 dl/g.

Comparative Example 3

Polymerization was carried out under the same conditions as in Example 1 except the alteration of TIBA to trimethylaluminium. Carrying out the same post-treatment as in Example 1, 268 mg of polyethylene was obtained. The polymerization activity was 107 g-PE/mmol-Ti·h, and the intrinsic viscosity (η) of the resultant polyethylene was 16.8 dl/g.

Analytical Example 1

Under a nitrogen atmosphere, 11 mg (0.015 mmol) of the complex compound (C1), 0.175 mmol of TIBA and 0.7 ml of deuterium substituted toluene were enclosed in an NMR sample tube, and retained at 50° C. for 30 min which corresponded to the condition of Example 1, followed by measuring $^1$H-NMR. As a result, AB quadruple lines derived from the benzyl amide structure resulted from the reduction of imine were observed at δ 4.40 ppm.

On the other hand, no corresponding peak was observed in the measurement after retaining at 25° C. for 30 min which corresponded to the condition of Comparative Example 1.

No corresponding peak was also observed in the measurement after retaining at 50° C. for 30 min with an alteration of TIBA to trimethylaluminium, which corresponded to the condition of Comparative Example 3.

Analytical Example 2

Under an argon atmosphere, 186 mg (0.253 mmol) of the complex compound (C1), 1.26 mmol of TIBA, and 20 ml of toluene were added and stirred at 50° C. for 30 min. After adding 22 ml of MeOH and 3 ml of HCl diethylether solution (1M), the extraction with n-hexane was carried out. The extract solution was dried under vacuum to obtain 168 mg of an oil compound of the following structure (yield; 86%).

$^1$H-NMR(CDCl$_3$, δ): 7.32(m,5H), 6.85(m,1H), 6.73(m, 1H), 5.95(bs, 1H), 4.12(s,2H), 3.20(bs,1H), 1.39(s,9H), 1.20 (s,9H)

FD-MS (m/z): 311 (intensity 100%,M$^+$)

On the other hand, carrying out the similar examination wherein the mixture was retained at 25° C. for 30 min which corresponded to the condition of Comparative Example 1, the ligand precursor (1) was recovered almost quantitatively.

The ligand precursor (1) was also recovered almost quantitatively from the examination where TIBA was replaced by trimethylaluminum and the mixture was retained at 50° C. for 30 min, which corresponded to the condition of

Comparative Example 3.

Examples 2 to 4

Polymerization was carried out under the same conditions as those in Example 1, except that the polymerization temperature, the reaction time period and the complex compound were changed. The results are shown in Table 1.

TABLE 1

| | Complex compound | Yield of PE (mg) | Activity (g/mmol-Ti · h) | (η] (dl/g) |
|---|---|---|---|---|
| Example 2 | (C1) | 2410 | 5784 | 6.6 |
| Example 3 | (C2) | 502 | 1204 | 13.3 |
| Example 4 | (C4) | 499 | 1150 | 9.7 |

Polymerization conditions:
complex compound: 0.005 mmol, TIBA 0.25 mmol, TrB 0.006 mmol
Toluene 250 ml, Temperature 75° C., Time 5 min,
Ethylene flow rate 100 l/h, Stirring rotation rate 600 rpm

Comparative Example 4

Polymerization was carried out under the same conditions as those in Example 2 except that TrB was not used, and as a result, 2 mg of polyethylene was obtained. The polymerization activity was 5 g-PE/mmol-Ti·h.

Example 5

Under an argon atmosphere, 0.030 mmol of the complex compound (C1), 0.350 mmol of TIBA, and 1.5 ml of toluene were stirred at 50° C. for 30 min, and then the entire solution was diluted with toluene to prepare 6 ml of a toluene solution. In an inner volume 500 ml of glass autoclave thoroughly purged with nitrogen, 250 ml of toluene was added, and liquid and gas phases were saturated with ethylene. Thereafter, 0.20 mmol of TIBA, subsequently 1.0 ml of the above toluene solution and 0.006 mmol of TrB were added to initiate polymerization.

The mixture was allowed to react at 75° C. for 5 min under an ethylene gas atmosphere at a normal atmospheric pressure. After the completion of polymerization, the reactant was dropped into a large volume of methanol to precipitate the whole volume of polymer, and then hydrochloric acid was added, and the resultant mixture was filtrated with a glass filter. The polymer was dried at 80° C. for 10 hours under reduced pressure to yield 3120 mg of polyethylene. The polymerization activity was 7704 g-PE/mmol-Ti·h.

Examples 6 and 7

Polymerization was carried out under the same conditions as those in Example 2, except that the amount of the complex compound (C1) was changed. The results are shown in Table 2.

TABLE 2

|  | Complex Compound (C1) (mmol) | Yield of PE (mg) | Activity (g/mmol-Ti · h) |
| --- | --- | --- | --- |
| Example 6 | 0.001 | 878 | 10536 |
| Example 7 | 0.0002 | 357 | 21420 |

Polymerization conditions:
TIBA 0.25 mmol, TrB 0.006 mmol, Toluene 250 ml,
Temperature 75° C., Time 5 min,
Ethylene flow rate 100 l/h,
Stirring rotation rate 600 rpm Example 8

Under an argon atmosphere, 0.005 mmol of the complex compound (C1), 0.25 mmol of TIBA, 0.006 mmol of TrB and 4.5 ml of toluene were stirred at room temperature for 30 min to prepare a toluene solution. In a glass autoclave having an inner volume of 500 ml and thoroughly purged with nitrogen, 250 ml of toluene was added, and liquid and gas phases were saturated with ethylene. Thereafter, 0.20 mmol of TIBA, and subsequently 0.9 ml of the above toluene solution were added to initiate polymerization.

The mixture was allowed to react at 75° C. for 5 min under an ethylene gas atmosphere at a normal atmospheric pressure. After the completion of polymerization, the reactant was dropped into a large volume of methanol to precipitate the whole volume of polymer, and then hydrochloric acid was added, and the resultant mixture was filtrated through a glass filter. The polymer was dried at 80° C. for 10 hours under a reduced pressure to yield 683 mg of polyethylene (PE). The polymerization activity was 8196 g-PE/mmol-Ti·h.

Example 9

Under an argon atmosphere, 266 mg (0.362 mmol) of the complex compound (C1), 289 mg (0.362 mmol) of lithium tetrakis (perfluorophenyl) borate diethylether complex, and 30 ml of diethylether were added in 50 ml flask, and stirred at −78° C. for 20 min, subsequently at room temperature for 2 hours. The solvent was distilled off under vacuum, and 15 ml of toluene was added. Insoluble lithium chloride was removed through glass filter. The solution was diluted with toluene to its total volume of 50 ml, and 1 ml thereof was diluted again with toluene up to 50 ml to prepare a diluted solution. In a glass autoclave having an inner volume of 500 ml and thoroughly purged with nitrogen, 250 ml of toluene was added, and liquid and gas phases were saturated with ethylene. Thereafter, 0.25 mmol of TIBA, and subsequently 0.69 ml of the above diluted solution were added to initiate polymerization.

The mixture was allowed to react at 75° C. for 5 min under an ethylene gas atmosphere at a normal atmospheric pressure. After the completion of polymerization, the reactant was dropped into a large volume of methanol to precipitate the whole volume of polymer, and then hydrochloric acid was added, and the resultant mixture was filtrated through a glass filter. The polymer was dried at 80° C. for 10 hours under reduced pressure to yield 721 mg of polyethylene (PE). The polymerization activity was 8652 g-PE/mmol-Ti·h, and the intrinsic viscosity ($\eta$) of the resultant polyethylene was 6.10 dl/g.

Example 10

The same manipulations as those in Example 9 were carried out using the complex compound (C3), and as a result, 101 mg of polyethylene (PE) was obtained. The polymerization activity was 1212 g-PE/mmol-Ti·h, and the intrinsic viscosity ($\eta$) of the resultant polyethylene was 10.6 dl/g.

Example 11

In a 1-liter stainless autoclave thoroughly purged with nitrogen, 340 ml of heptane and 23 liters of gaseous propylene were charged at room temperature, and then the temperature was increased up to 80° C. Subsequently, the pressure was increased with ethylene up to 8 kg/cm$^2$ of the entire pressure. Then, 0.15 mmol of TIBA and a toluene solution, previously prepared by the same procedure as in Example 8, containing 0.1 mmol of TIBA, 0.002 mmol of the complex compounds (C1) and 0.004 mmol of TrB were added to initiate polymerization while keeping the temperature at 80° C. After 60 min, the polymerization was stopped by the addition of methanol. The resultant polymer solution was added to 1.5 liters of the mixed solvent of acetone/methanol (1:1) to precipitate a polymer. After separating from the solvent, the residue was dried at 130° C. for 10 hours under a reduced pressure.

The resultant ethylene/propylene copolymer was 14.2 g, and its propylene content was 23 mol %, and the intrinsic viscosity ($\eta$) was 13.8 dl/g.

Example 12

In 1-liter stainless autoclave thoroughly purged with nitrogen, 250 ml of heptane and 150 ml of 1-butene were charged at room temperature, and then the temperature was increased up to 80° C. Subsequently, the pressure was increased with ethylene up to 8 kg/cm$^2$ of the entire pressure. Then, 0.15 mmol of TIBA and a toluene solution, previously prepared by the same procedure as in Example 8, containing 0.05 mmol of TIBA, 0.001 mmol of the complex compound (C1) and 0.002 mmol of TrB were added to initiate polymerization while keeping the temperature at 80° C. After 90 min, the polymerization was stopped by the addition of methanol. The resultant polymer solution was added to 1.5 liters of the mixed solvent of acetone/methanol (1:1) to precipitate a polymer. After separating from the solvent, the residue was dried at 130° C. for 10 hours under a reduced pressure.

The resultant ethylene/butene copolymer was 9.99 g, and its butene content was 19.3 mol %, and the intrinsic viscosity ($\eta$) was 16.5 dl/g.

What is claimed is:

1. A process for polymerizing an olefin comprising polymerizing or copolymerizing an olefin at a polymerization reaction temperature of 50 to 170° C. in the presence of an olefin polymerization catalyst consisting essentially of:

(A) a transition metal compound represented by the following formula (I), (B-1) an organoaluminum compound having reducing ability which reacts with the transition metal compound (A) to convert an imine structure moiety to a metal amide structure, and (B-2) a compound which reacts with the transition metal compound (A) to form an ion pair;

wherein said transition metal compound is represented by the following formula (I)

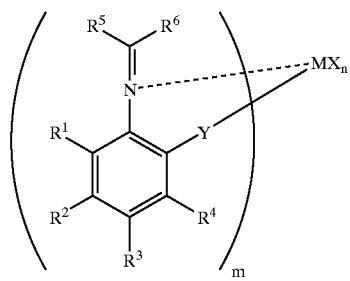

wherein M is a transition metal atom of Groups 4 and 5 of the periodic table, m is an integer of 1 to 6, Y is an oxygen atom, a sulfur atom or a selenium atom, or a nitrogen atom having a substituent $R^7$, $R^1$ to $R^7$ may be the same or different, and are each a hydrogen atom, a halogen atom, a hydrocarbon group, an oxygen-containing group, a nitrogen-containing group, a boron-containing group, a sulfur-containing group, a phosphorus-containing group, a heterocyclic compound residual group, a silicon-containing group, a germanium-containing group or a tin-containing group, two or more of $R^1$ to $R^7$ may be bonded to each other to form a ring except for the case where $R^1$ and $R^5$ or $R^1$ and $R^6$ are bonded to each other to form an aromatic ring, and when m is 2 or greater, one group of $R^1$ to $R^7$ contained in one ligand and one group of $R^1$ to $R^7$ contained in other ligands may be bonded, and $R^1$s, $R^2$s, $R^3$s, $R^4$s, $R^5$s, $R^6$s and $R^7$s may be the same or different, n is a number satisfying a valence of M, and X is a hydrogen atom, a halogen atom, a hydrocarbon group, an oxygen-containing group, a nitrogen-containing group, a boron-containing group, a sulfur-containing group, a phosphorus-containing group, a halogen-containing group, an aluminum-containing group, a heterocyclic compound residual group, a silicon-containing group, a germanium-containing group or a tin-containing group, and when n is 2 or greater, plural groups indicated by X may be the same or different, and plural groups indicated by X may be bonded to each other to form a ring, and wherein the catalyst activity is at least 1000 kg polyolefin/ mole transition metal atom hr.

2. The process for polymerizing an olefin as claimed in claim 1, wherein the transition metal compound (A) is a compound in which $R^4$ in the above formula (I) is a halogen atom, a hydrocarbon group, an oxygen-containing group, a nitrogen-containing group, a boron-containing group, a sulfur-containing group, a phosphorus-containing group, a heterocyclic compound residual group, a silicon-containing group, a germanium-containing group or a tin-containing group.

3. The process as claimed in claim 1, wherein the transition metal atom (M) in the formula (I) is selected from the group consisting of titanium, zirconium and hafnium.

* * * * *